(12) United States Patent
Sambhwani et al.

(10) Patent No.: US 8,780,704 B2
(45) Date of Patent: Jul. 15, 2014

(54) SHARED RESOURCE ALLOCATION

(75) Inventors: Sharad Deepak Sambhwani, San Diego, CA (US); Bibhu P. Mohanty, San Diego, CA (US); Rohit Kapoor, San Diego, CA (US); Ozcan Ozturk, San Diego, CA (US); Mehmet Yavuz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 786 days.

(21) Appl. No.: 12/350,690

(22) Filed: Jan. 8, 2009

(65) Prior Publication Data

US 2009/0185528 A1 Jul. 23, 2009

Related U.S. Application Data

(60) Provisional application No. 61/020,219, filed on Jan. 10, 2008, provisional application No. 61/039,082, filed on Mar. 24, 2008, provisional application No. 61/048,782, filed on Apr. 29, 2008.

(51) Int. Cl.
*H04J 1/16* (2006.01)

(52) U.S. Cl.
USPC .......................................... 370/229; 370/412

(58) Field of Classification Search
USPC .............. 370/230, 229, 230.1, 231, 232, 234, 370/235, 329
See application file for complete search history.

(56) References Cited

U.S. PATENT DOCUMENTS

| 7,256,922 | B2 | 8/2007 | Chui et al. | |
| 7,447,180 | B2 | 11/2008 | Jeong et al. | |
| 7,567,373 | B2 | 7/2009 | Chui et al. | |
| 7,957,355 | B1 * | 6/2011 | Heiferling et al. | 370/338 |
| 2003/0152031 | A1 * | 8/2003 | Toskala et al. | 370/236 |
| 2005/0223141 | A1 * | 10/2005 | Seto et al. | 710/57 |
| 2006/0256721 | A1 * | 11/2006 | Yarlagadda et al. | 370/235 |
| 2007/0217333 | A1 * | 9/2007 | Seo et al. | 370/229 |
| 2009/0225709 | A1 * | 9/2009 | Wager et al. | 370/329 |

FOREIGN PATENT DOCUMENTS

| CN | 1481180 A | 3/2004 |
| EP | 0720330 A2 | 7/1996 |
| EP | 1376950 A1 | 1/2004 |
| JP | 8242232 A | 9/1996 |
| JP | 2004192380 A | 7/2004 |
| JP | 2005311885 A | 11/2005 |
| RU | 2005129104 A | 2/2006 |

(Continued)

OTHER PUBLICATIONS

International Search Report and Written Opinion—PCT/US2009/030658, International Search Authority—European Patent Office, Aug. 12, 2009.

(Continued)

*Primary Examiner* — Dady Chery
(74) *Attorney, Agent, or Firm* — Charles E. Eggers

(57) ABSTRACT

A base station can employ a shared resource, such as a control channel, for communication with a mobile device. The mobile device can be granted the exclusive access to the shared resource for a limited time. The exclusive access can be such that there is not a limit in message size that can be transferred across the shared resource. To improve operation, the exclusive grant can be applied until it is determined that appropriate packets are transferred.

30 Claims, 21 Drawing Sheets

(56) References Cited

FOREIGN PATENT DOCUMENTS

| WO | WO0163401 | 8/2001 |
| WO | WO-03019376 A1 | 3/2003 |
| WO | WO2004075596 A2 | 9/2004 |
| WO | WO2005027398 A1 | 3/2005 |

OTHER PUBLICATIONS

Taiwan Search Report—TW098100861—TIPO—May 25, 2012.
Taiwan Search Report—TW098100861—TIPO—May 23, 2013.
Taiwan Search Report—TW098100861—TIPO—Nov. 21, 2013.

\* cited by examiner

SHARED RESOURCE ALLOCATION

CROSS-REFERENCE

This application claims priority to U.S. Application No. 61/020,219 entitled "E-DCH RESOURCE RELEASE IN CELL_FACH STATE", which was filed on Jan. 10, 2008. The entirety of which is herein incorporated by reference.

This application claims priority to U.S. Application No. 61/039,082 entitled "E-DCH RESOURCE RELEASE IN CELL_FACH STATE", which was filed on Mar. 24, 2008. The entirety of which is herein incorporated by reference.

This application claims priority to U.S. Application No. 61/048,782 entitled "E-DCH RESOURCE RELEASE IN CELL_FACH STATE", which was filed on Apr. 29, 2008. The entirety of which is herein incorporated by reference.

BACKGROUND

1. Field

The following description relates generally to wireless communications and, more particularly, to managing a shared resource.

2. Background

Wireless communication systems are widely deployed to provide various types of communication content such as, for example, voice, data, and so on. Typical wireless communication systems can be multiple-access systems capable of supporting communication with multiple users by sharing available system resources (e.g., bandwidth, transmit power, . . . ). Examples of such multiple-access systems can include code division multiple access (CDMA) systems, time division multiple access (TDMA) systems, frequency division multiple access (FDMA) systems, orthogonal frequency division multiple access (OFDMA) systems, and the like.

Generally, wireless multiple-access communication systems can simultaneously support communication for multiple mobile devices. Each mobile device can communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations can be established via single-input single-output (SISO) systems, multiple-input single-output (MISO) systems, multiple-input multiple-output (MIMO) systems, and so forth.

MIMO systems commonly employ multiple (NT) transmit antennas and multiple (NR) receive antennas for data transmission. A MIMO channel formed by the NT transmit and NR receive antennas can be decomposed into NS independent channels, which can be referred to as spatial channels. Each of the NS independent channels corresponds to a dimension. Moreover, MIMO systems can provide improved performance (e.g., increased spectral efficiency, higher throughput and/or greater reliability) if the additional dimensionalities created by the multiple transmit and received antennas are utilized.

MIMO systems can support various duplexing techniques to divide forward and reverse link communications over a common physical medium. For instance, frequency division duplex (FDD) systems can utilize disparate frequency regions for forward and reverse link communications. Further, in time division duplex (TDD) systems, forward and reverse link communications can employ a common frequency region.

However, conventional techniques can provide limited or no feedback related to channel information.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one aspect, there can be a method for administering operation of a mobile device operable upon a wireless communication device. The method can include determining that a content level of a buffer of the mobile device reaches a predetermined level. Additionally, the method can include evaluating an acknowledgement set to establish if appropriate acknowledgements are collected, the evaluation occurs upon the content level reaching the predetermined level.

With another aspect, there can be an apparatus with a checker that determines that a content level of a buffer of the mobile device reaches a predetermined level. The apparatus can also include an analyzer that evaluates an acknowledgement set to establish if appropriate acknowledgements are collected, the evaluation occurs upon the content level reaching the predetermined level.

A further aspect can include at least one processor configured to administer operation of a mobile device. The processor can include a first module for determining that a content level of a buffer of the mobile device reaches a predetermined level. A second module can be part of the apparatus for evaluating an acknowledgement set to establish if appropriate acknowledgements are collected, the evaluation occurs upon the content level reaching the predetermined level.

Moreover, an aspect can use a computer program product with a computer-readable medium. The medium can include a first set of codes for causing a computer to determine that a content level of a buffer of the mobile device reaches a predetermined level. The medium can also include a second set of codes for causing the computer to evaluate an acknowledgement set to establish if appropriate acknowledgements are collected, the evaluation occurs upon the content level reaching the predetermined level.

In yet another aspect, there can be an apparatus with means for determining that a content level of a buffer of the mobile device reaches a predetermined level. The apparatus can also function with means for evaluating an acknowledgement set to establish if appropriate acknowledgements are collected, the evaluation occurs upon the content level reaching the predetermined level.

In accordance with one aspect, there can be a method for managing exclusive use of a shared resource operable upon a wireless communication device. The method can include identifying a request obtained through use of a receiver, the request is from a mobile device for exclusive use of the shared resource. Additionally, the method can include granting the mobile device exclusive use to the shared resource for a set time length.

With another aspect, there can be an apparatus that incorporates a recognizer that identifies a request, the request is from a mobile device for exclusive use of the shared resource. The apparatus can also incorporate an allocator that grants the mobile device exclusive use to the shared resource for a set time length.

A further aspect can include at least one processor configured to manage exclusive use of a shared resource. The processor can include a first module for identifying a request, the request is from a mobile device for exclusive use of the shared resource. Additionally, the processor can include a second module for granting the mobile device exclusive use to the shared resource for a set time length.

Moreover, an aspect can use a computer program product that includes a computer-readable medium. The medium can include a first set of codes for causing a computer to identify a request, the request is from a mobile device for exclusive use of the shared resource. Also, the medium can include a second set of codes for causing the computer to grant the mobile device exclusive use to the shared resource for a set time length.

In yet another aspect, there can be an apparatus that incorporates means for identifying a request, the request is from a mobile device for exclusive use of the shared resource. The apparatus can also include means for granting the mobile device exclusive use to the shared resource for a set time length.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects can be employed, and this description is intended to include all such aspects and their equivalents.

DETAILED DESCRIPTION

Figure 1:
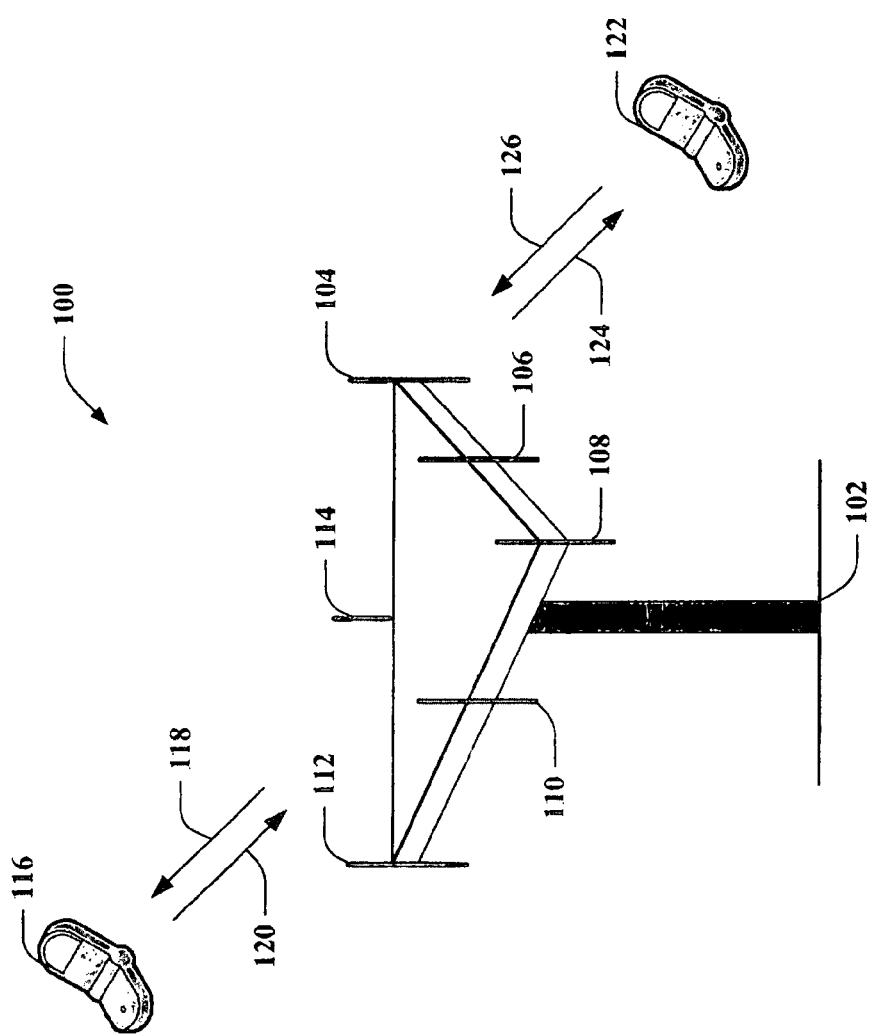
FIG. 1 is an illustration of a wireless communication system in accordance with various aspects set forth herein.

Various aspects are now described with reference to the drawings, wherein like reference numerals are used to refer to like elements throughout. In the following description, for purposes of explanation, numerous specific details are set forth in order to provide a thorough understanding of one or more aspects. It can be evident, however, that such aspect(s) can be practiced without these specific details. In other instances, well-known structures and devices are shown in block diagram form in order to facilitate describing one or more embodiments.

As used in this application, the terms "component," "module," "system" and the like are intended to include a computer-related entity, such as but not limited to hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal can be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station can be utilized for communicating with wireless terminal(s) and can also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

The techniques described herein can be used for various wireless communication systems such as CDMA, TDMA, FDMA, OFDMA, SC-FDMA and other systems. The terms "system" and "network" are often used interchangeably. A CDMA system can implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM□, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems can additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

The set of antennas and/or the area in which they are designated to communicate can be referred to as a sector of base station 102. For example, multiple antennas can be designed to communicate to mobile devices in a sector of the areas covered by base station 102. In communication over forward links 118 and 124, the transmitting antennas of base station 102 can utilize beamforming to improve signal-to-noise ratio of forward links 118 and 124 for mobile devices 116 and 122. Also, while base station 102 utilizes beamforming to transmit to mobile devices 116 and 122 scattered randomly through an associated coverage, mobile devices in neighboring cells can be subject to less interference as compared to a base station transmitting through a single antenna to all its mobile devices.

Figure 2:
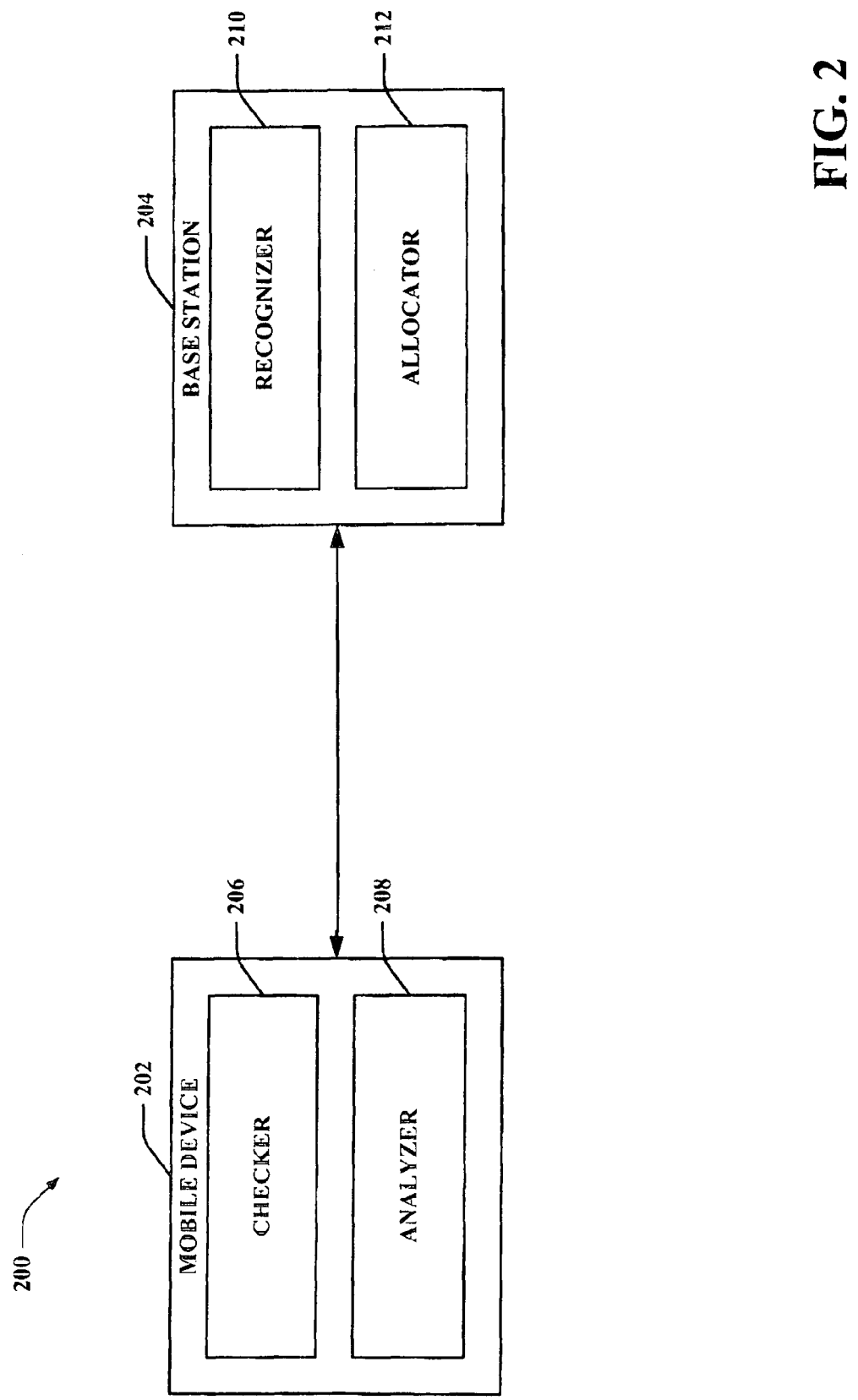
FIG. 2 is an illustration of a representative system for managing a shared resource in accordance with at least one aspect disclosed herein.

Now referring to FIG. 2, an example system 200 is disclosed for managing a shared resource (e.g., Enhanced Dedicated Channel (E-DCH) for a Common Control Channel (CCCH) message or Dedicated Control Channel (DCCH) message). In a wireless communication system, certain resources can be shared among multiple mobile devices (e.g., mobile device 202) associated with a base station (e.g., base station 204). However, for proper operation to occur, a mobile device can be provided exclusive, yet limited usage of the shared resource, such as being limited in message size (e.g., a number of bytes) allowed for transmission or have exclusive use to the shared resource for a limited time. Moreover, the limited message size can be a size of a single message where multiple messages can be sent. If exclusive access is not provided, then the base station could receive packets from multiple mobile devices and have difficulty distinguishing which packets originate from which mobile device, thus messages could be lost, operation could be hampered, and the like.

The mobile device 202 (e.g., with a checker 206 and analyzer 208) can request access to a shared resource, and the base station 204 can regulate access to the shared resource. A recognizer 210 can be employed to identify the request (e.g., the request is from the mobile device 202 for exclusive use of the shared resource). The base station 204 can evaluate the shared resource to determine if the resource is used exclusively by another mobile device. Moreover, the base station 204 can perform checks related to the shared resource (e.g., determine if the mobile device 202 is authorized to be granted access to the resource). With appropriate authorization, the base station 204 can grant the mobile device 202 exclusive use to the resource for a set time length, such as through use of an allocator 212. While depicted as part of the base station 204, it is to be appreciated that aspects, such as use of the recognizer 210 and/or allocator 212, can operate on other device, such as a separate, independent entity.

The mobile device 202 and base station 204 can exchange information, such that the mobile device 202 sends packets to the base station 204 (e.g., uplink). The base station 204 can process a collected packet (e.g., a message is made of at least one packet) and transfer an acknowledgement to the mobile device 202 (e.g., downlink). According to one embodiment, packets transferred by the mobile device 202 are not limited in size—however, it is possible for there to be a size limit.

A checker 206 can be used that determines that a content level of a buffer (e.g., containing data waiting for a first transmission attempt) of the mobile device 202 reaches a predetermined level (e.g., zero—there are no more packets for the mobile device 202 to transfer in a first attempt). An analyzer 208 can be employed for evaluating an acknowledgement set to establish if appropriate acknowledgement is accounted for—in one embodiment, the evaluation occurs upon the content level reaching zero. If there is no more information to transfer (e.g., the buffer is empty, the content level of the buffer for a particular message is at zero, etc.) and appropriate acknowledgements are received, then the mobile device 202 can release the resource. While a timer can expire for use by the mobile device 202 of the shared resource, the resource can be withheld from release until appropriate acknowledgements are received. Moreover, the resource can be released before the timer expires (e.g., all packets are sent and acknowledged for before the timer ends). Although depicted as part of the mobile device 202, it is to be appreciated that aspects, such as use of the checker 206 and/or analyzer 208, can operate on other device, such as a separate, independent entity.

The checker 206 can start a timer when the buffer reaches the predetermined level and monitor the timer. The analyzer 208 can determine that the timer expires when expiration occurs and can determine if the buffer is empty, upon determining that the buffer is empty scheduling information can be sent.

A conclusion can be made by the analyzer 208 on if a last packet is sufficient to carry the scheduling information. There can be transferring the scheduling information on the last packet upon a positive conclusion or transferring the scheduling information on a later packet upon a negative conclusion (e.g., by a transmitter). The analyzer 208 can also determine if the acknowledgement set is empty, upon determining that the acknowledgement set is empty the resource can be released. Moreover the analyzer 208 can identify that the buffer receives a packet as well as determine if the timer is expired—if the timer is not expired, then the timer can be reset.

Figure 3:
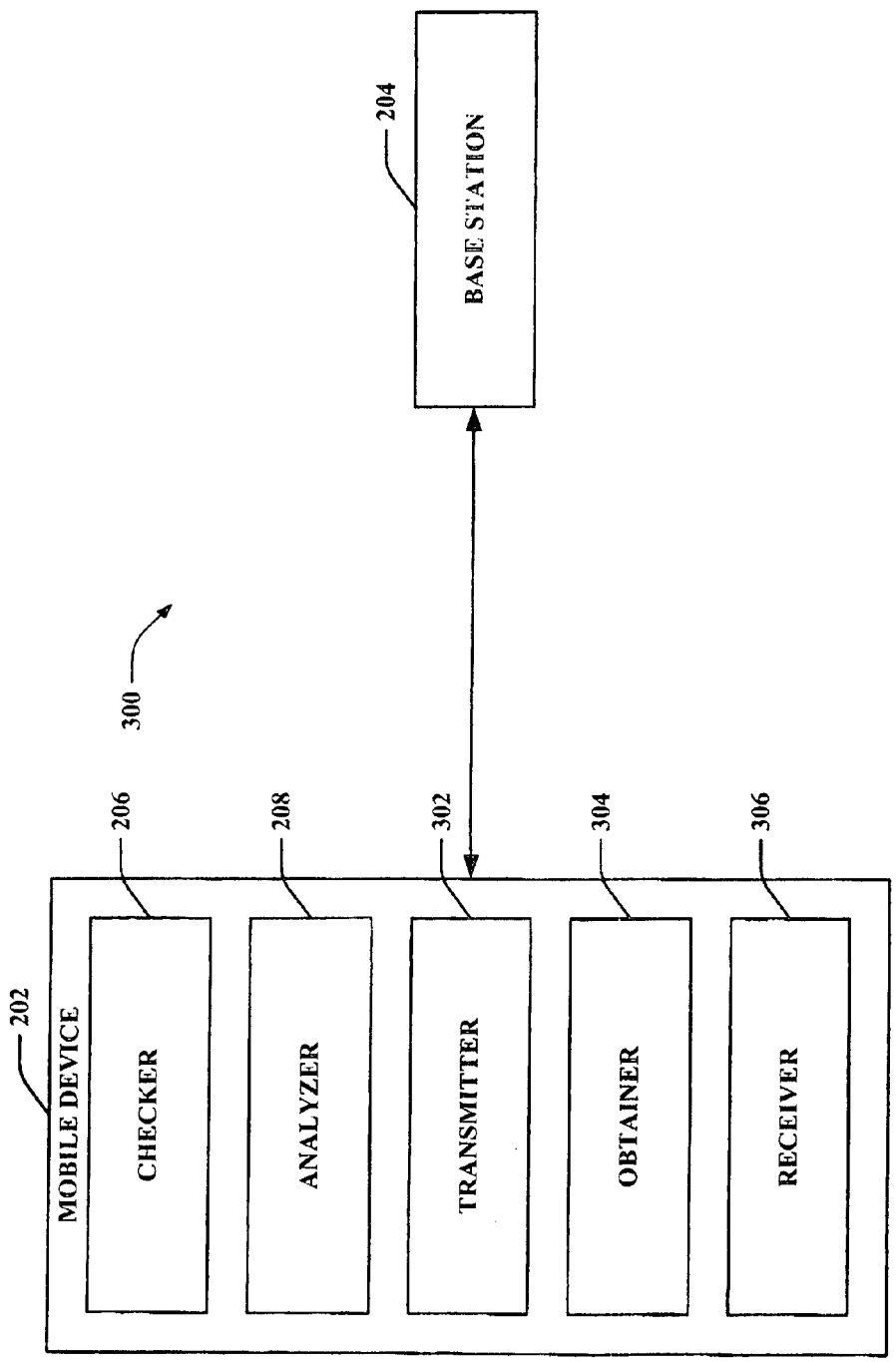
FIG. 3 is an illustration of a representative system with a detailed mobile device for processing acknowledgements in accordance with at least one aspect disclosed herein.

Referring to FIG. 3, an example system 300 is disclosed for managing a shared resource for communication between a base station 202 and mobile device 204 (e.g., with a checker 206 and analyzer 208). The mobile device 204 can employ a transmitter 302 (e.g., antenna) that emits at least one packet upon a shared resource to which the mobile device 202 has exclusive access for a limited time. In one implementation, the at least one packet includes a request for an acknowledgement for addition in the acknowledgement set in response to successfully packet obtainment (e.g., collection, collection and processing, etc.). An obtainer 304 can be used that collects at least one acknowledgement (e.g., collected through use of a receiver 306), where the acknowledgement set can include the collected acknowledgement.

In an alternative embodiment, the transmitter 302 can transfer a packet from the mobile device 202 to the base station 204 and upon obtaining the packet, the base station 204 transfers an acknowledgement that the packet is successfully obtained and the transferred acknowledgement is added to the acknowledgement set upon collection. For instance, the packet is transferred along a shared resource to which the mobile device has exclusive access for a limited time. A check can occur to match the acknowledgement with a packet and the matched packet can be deleted from a buffer (e.g., packets not matched represent a content level of the buffer). Therefore, the buffer can include packets already transmitted and waiting for acknowledgement as well as packets waiting for first time transmission.

Figure 4:
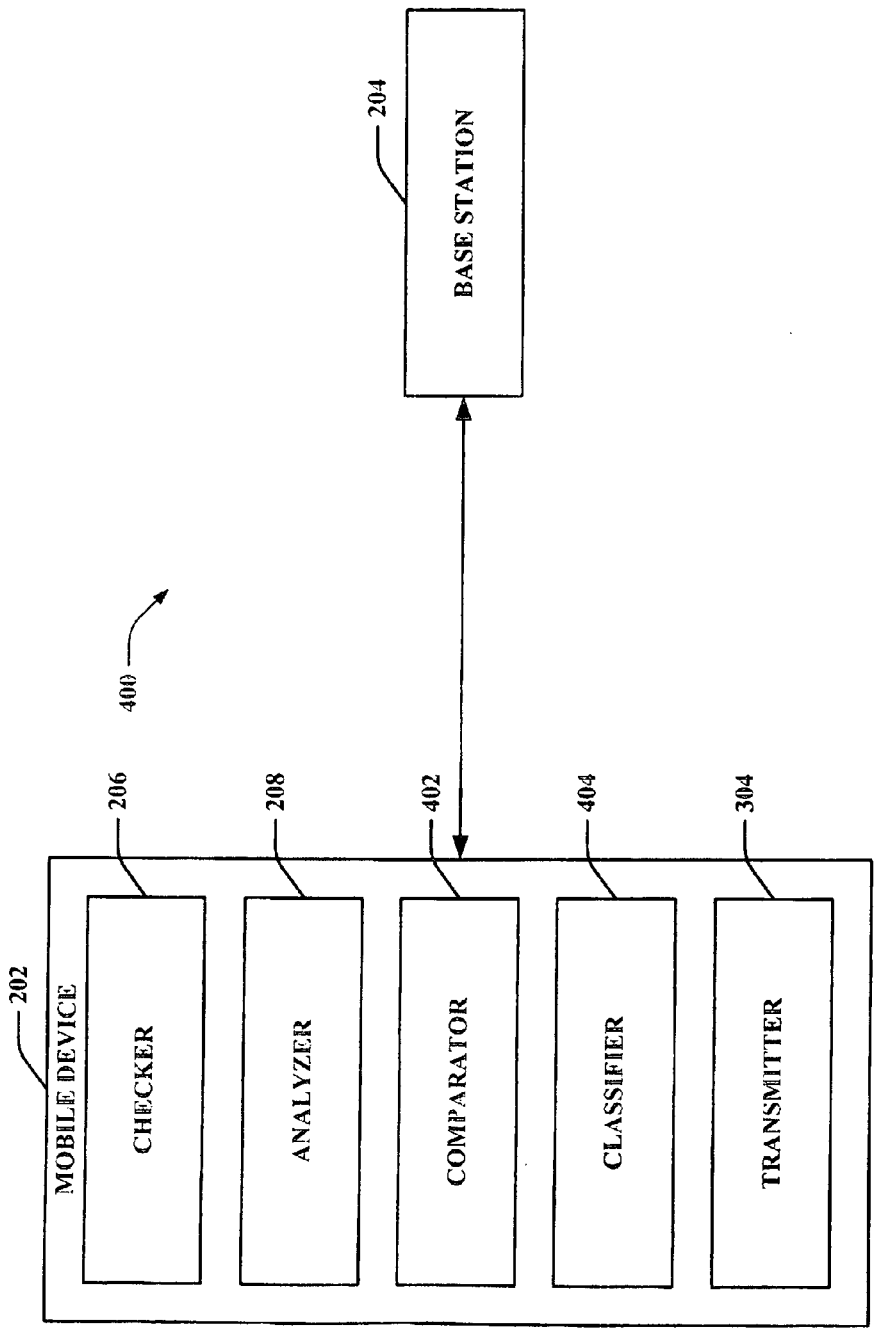
FIG. 4 is an illustration of a representative system with a detailed mobile device for requesting acknowledgement for a transferred packet in accordance with at least one aspect disclosed herein.

Now referring to FIG. 4, an example system 400 is disclosed with a mobile device 202 (e.g., with a checker 206 and analyzer 208) engaging in communication with a base station 204. Based upon an output of the analyzer 208 (e.g., determining if acknowledgements are accounted for), a comparator 402 can establish if appropriate acknowledgement is accounted for or not. If it is established that acknowledgements are accounted for (e.g., each transferred packet has an associated acknowledgement that is collected), then a transmitter 302 can emits a notice (e.g., to the base station 204) upon establishing that the appropriate acknowledgement is accounted for; the notice can be indicative that there is no more data to send and a shared resource to which the mobile device 202 has exclusive access should be released.

However, it is possible that the comparator 402 establishes that there is an acknowledgement (e.g., at least one) missing (e.g., based upon a result of the analyzer 208). A classifier 404 can evaluate the acknowledgement set and identify at least one missing acknowledgement. The transmitter 304 can retransmit a packet that associates with the missing acknowledgement. In an alternative embodiment, the transmitter 304 can send a status check to the base station 204 to determine why an acknowledgement is not in the acknowledgement set (e.g., the base station 204 did not receive the packet, did not successfully identify or process the packet, the acknowledgement is lost in communication, etc.). Based upon a response, the mobile device 202 can function accordingly (e.g., retransmit the packet, request another acknowledgement, etc.).

Figure 5:
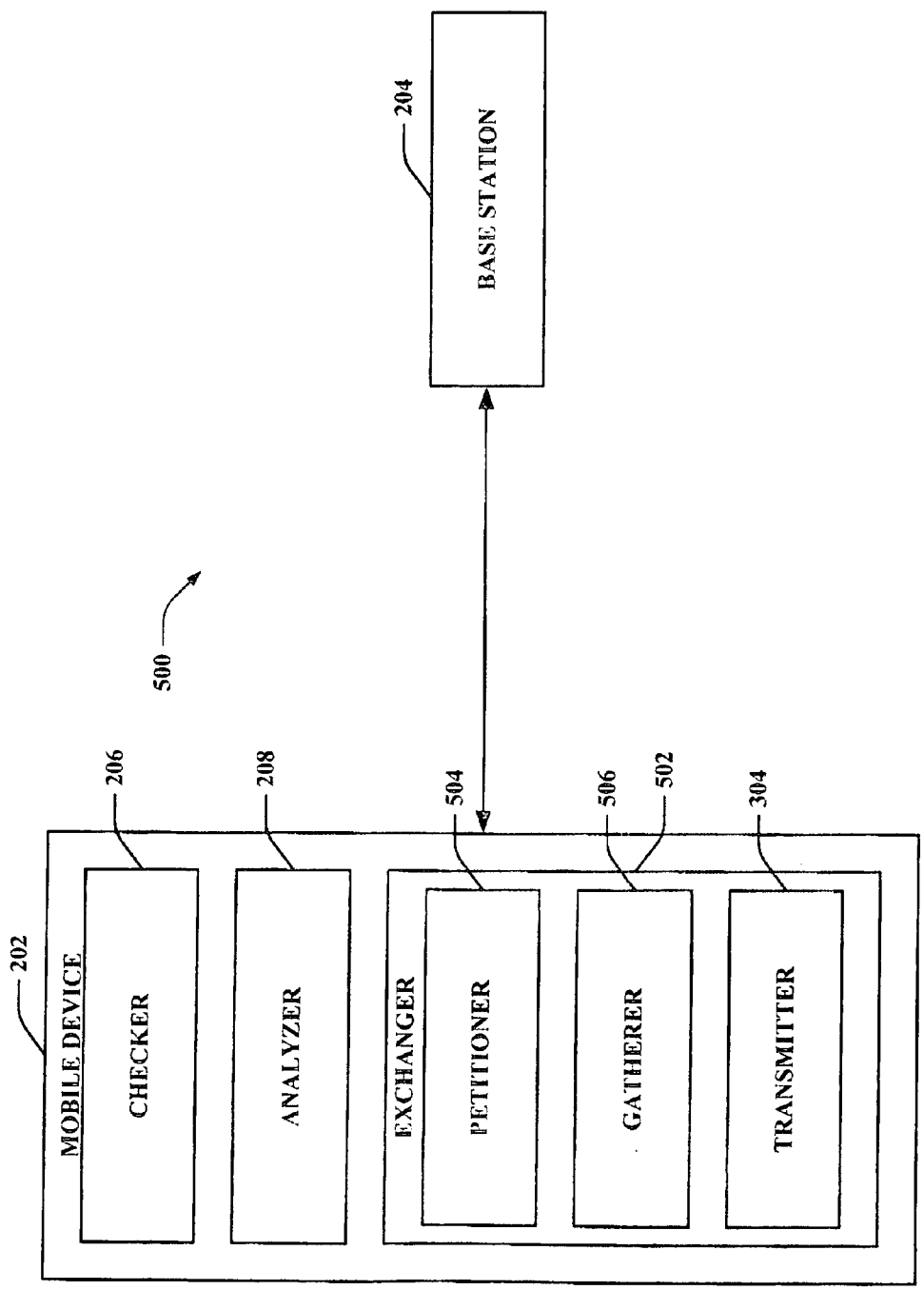
FIG. 5 is an illustration of a representative system with a detailed mobile device using an exchanger for communication with a base station in accordance with at least one aspect disclosed herein.

Referring now to FIG. 5, an example system 500 is disclosed with a detailed mobile device 202 (e.g., with a checker 206 and analyzer 208) requesting exclusive access from a base station 204. An exchanger 502 can be used to engage the mobile device 202 with the base station 204—specifically regarding making requests for a shared resource. The exchanger 502 can evaluate operation of the mobile device (e.g., current operation, scheduled operation, etc.) and determine that a shared resource should be dedicated (e.g., to facilitate optimal operation) to the mobile device (e.g., for a limited time). Thus, not only can the mobile device 202 determine that a resource should be used, but analysis can occur to determine (e.g., estimate) how long the mobile device 202 should need the resource to properly transmit.

A petitioner 504 can request exclusive access to a shared resource for the mobile device 202. The base station 204 can obtain the request, process contents of the request, and produce an instruction that exclusive access is granted, which is communicated to the mobile device 202. A gatherer 506 can collect that instruction that the exclusive access is granted for a timeframe. A transmitter 304 can emit at least one packet upon the shared resource. According to one embodiment, the at least one packet includes a request for an acknowledgement for addition in the acknowledgement set in response to successfully packet obtainment. While being depicted as part of the exchanger 502, it is to be appreciated that the petitioner 504, gatherer 506, and/or transmitter 304 can implement as separate units.

Figure 6:
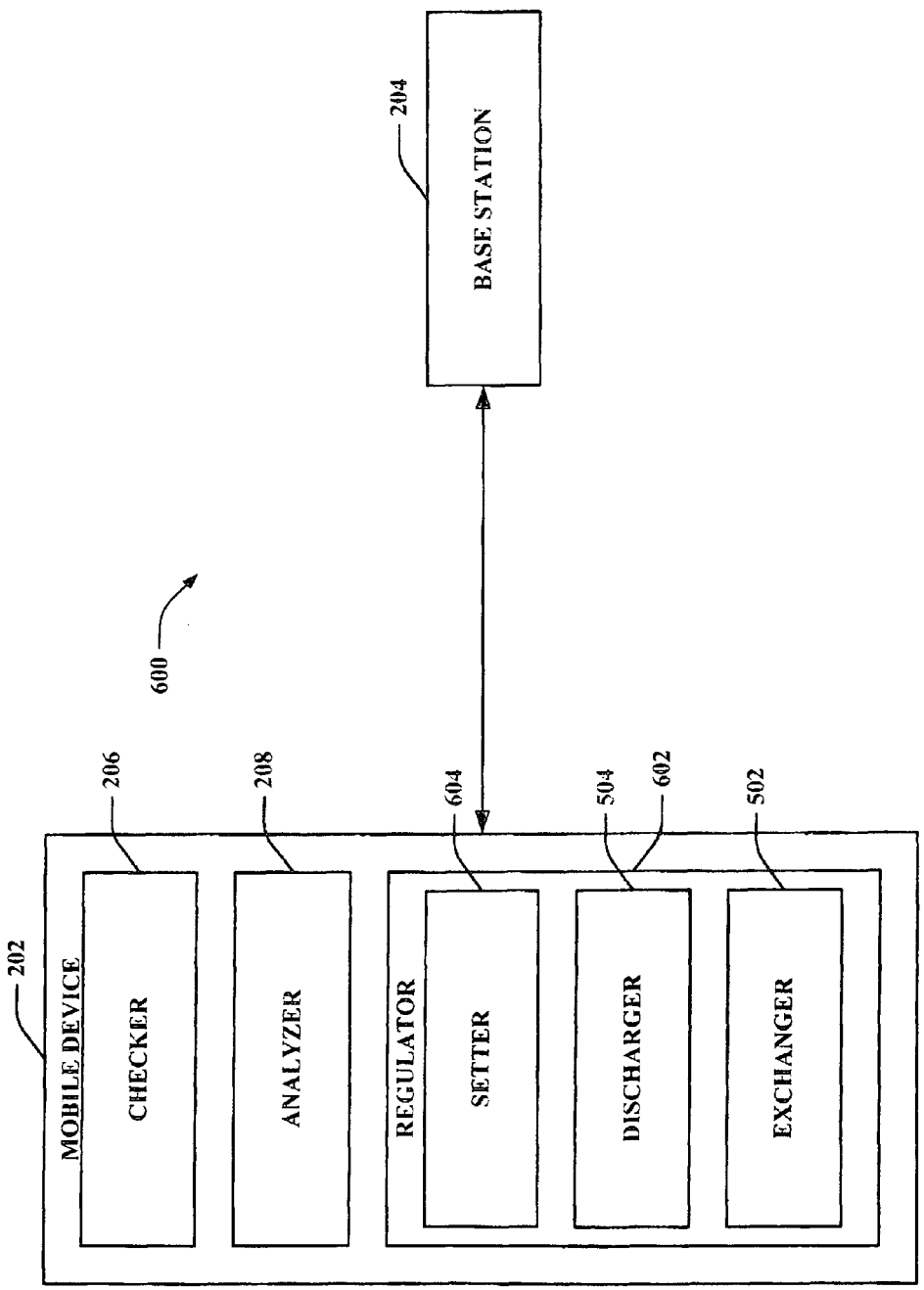
FIG. 6 is an illustration of a representative system with a detailed mobile device using a regulator for communication with a base station in accordance with at least one aspect disclosed herein.

Referring now to FIG. 6, an example system 600 is disclosed with a mobile device 202 (e.g., with a checker 206 and analyzer 208) that manages time in relation to use of a resource allocated from a base station 204. The mobile device 202 can be permitted exclusive use to the shared resource for a limited time—after the timeframe, the mobile device 202 can be banned from use (e.g., unless time is extended, another session is approved, etc.), other mobile devices can use the resource, etc. Since other mobile devices can desire to use the shared resource while the mobile device 202 has exclusive access, a regulator 602 can be employed to manage time of exclusive use.

The regulator 602 can instigate a timer in relation to the shared resource (e.g., upon emitting the at least one packet, upon obtaining an instruction from the base station 204, at a time and/or for a length included in the instruction, etc.). A discharger 604 can be employed to release the shared resource from exclusivity at an appropriate time (e.g., identifying that time expires, inferring that there is a resource collision, etc.). Moreover, the regulator 602 can include an exchanger 502 for use in requesting exclusive access to the shared resource.

Figure 7:
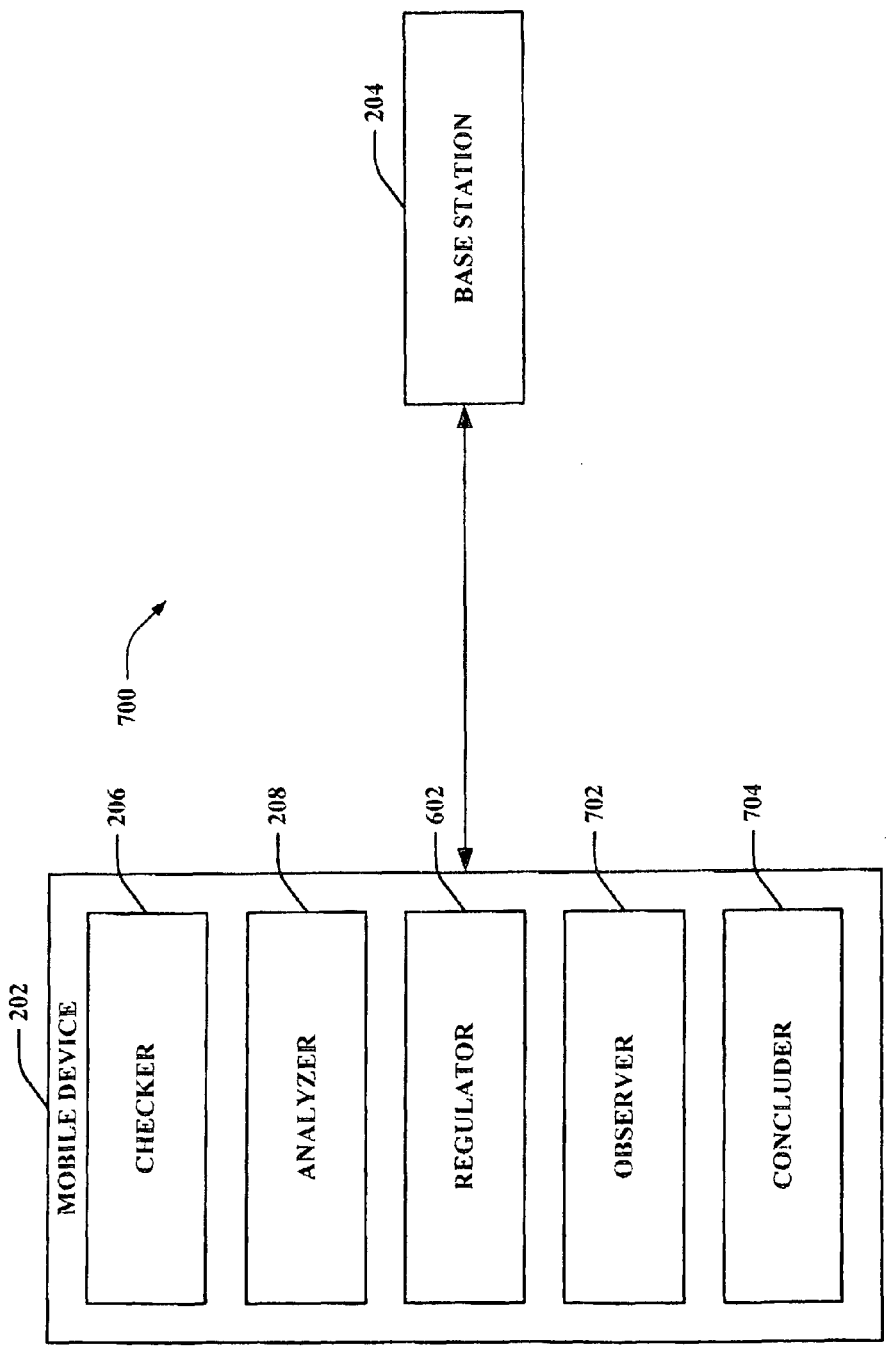
FIG. 7 is an illustration of a representative system with a mobile device that manages communication with a base station in accordance with at least one aspect disclosed herein.

Now referring to FIG. 7, an example system 700 is disclosed for resource collision management concerning a base station 204 and mobile device 202 (e.g., with a checker 206 and analyzer 208). It is possible that the base station 204 obtains a request for exclusive use of a shared resource at one time (e.g., at an identical time, at a time with a tolerance, etc.). If there is a resource collision (e.g., through granting of the resource to more than one requester), then the base station 202 can have difficulty distinguishing packets from different messages.

The mobile device 202 to request exclusive access can use a regulator 602. In one embodiment, if no instruction is received from the base station 204, then an inference can be drawn that a collision occurs and another request can be sent at a random time within a time range (e.g., to avoid sending at a same time as another mobile device causing another collision). Conversely, the base station 204 can grant access to multiple mobile devices—the mobile device 202 can receive a notice that exclusive access is granted. A packet can be transferred and an observer 702 can be employed that monitors for an acknowledgement to the packet. A concluder 704 can be used that infers that there is resource collision when the timer reaches a set level and an acknowledgement is not collected. For example, the base station 204 can have difficulty identifying which mobile device sent a packet and thus an acknowledgement is not transferred.

Figure 8:
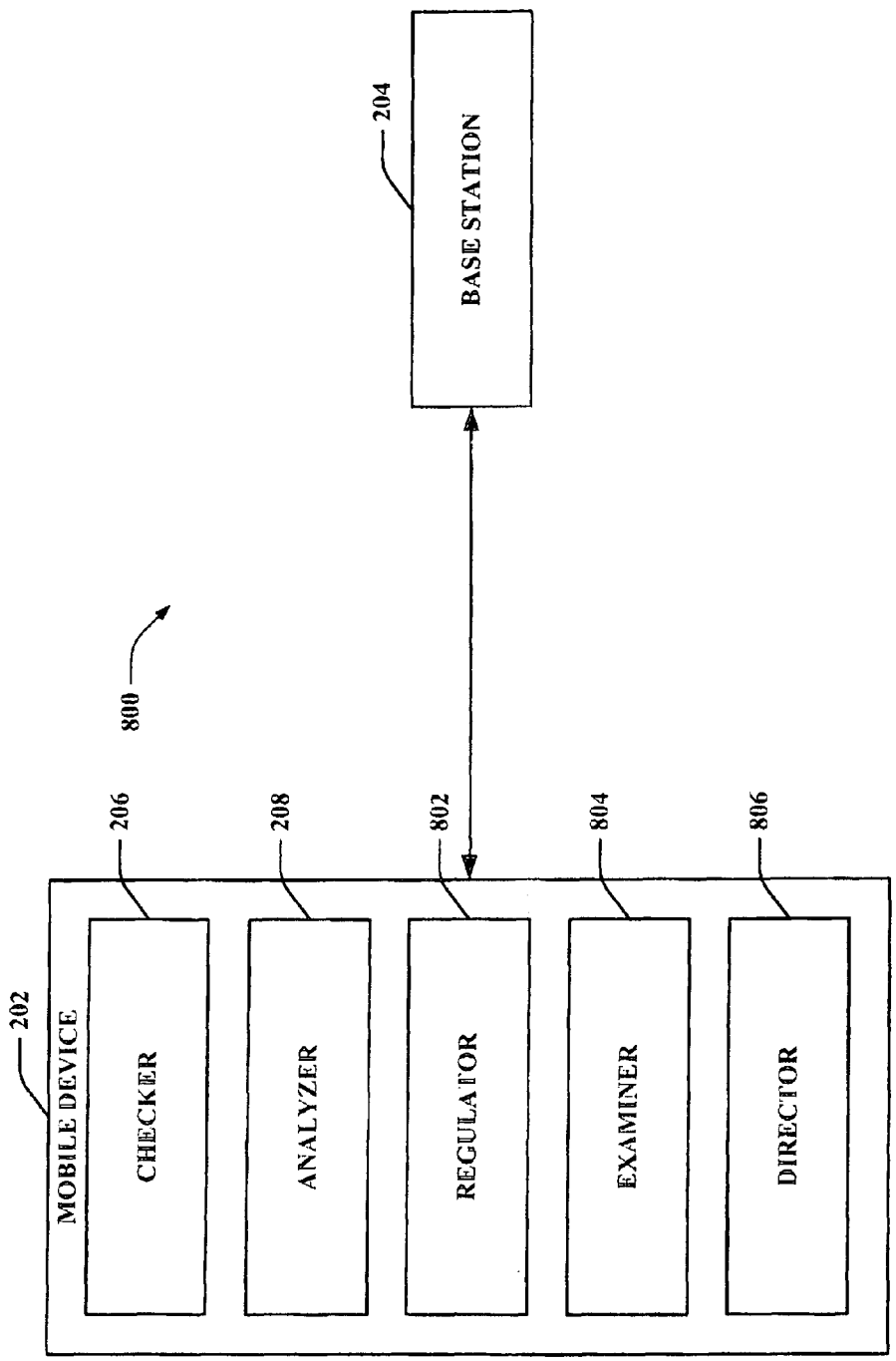
FIG. 8 is an illustration of a representative system with a mobile device that manages packet emission in accordance with at least one aspect disclosed herein.

Referring to FIG. 8, an example system 800 is disclosed for timing resource use granted by a base station 204 for a mobile device 202 (e.g., with a checker 206 and analyzer 208). A regulator 602 can engage with the base station 204 for procurement of private access to a shared resource (e.g., that does not limit message size). As part of the engagement, the base station 204 can restrict an amount of time the mobile device can have private access and the mobile device 202 can set a timer.

The timer can run and an examiner 802 can be used that identifies when the timeframe of the shared resource expires. When expiration occurs or when expiration is near, the mobile device 202 can determine if packets have appropriate acknowledgements transferred. When acknowledgements are received or when time expires, the exclusive access can be terminated.

Since there is a limited time for access, a director 804 can manage packet emission based upon the timeframe. Thus, emission of the at least one packet occurs in accordance with the management. For example, the mobile device 202 can have a relatively large amount of information to transfer—however, due to a relatively large number of requests, the mobile device can be provided a small timeframe. The mobile device 202 can select messages that are of a highest importance and transfer those messages first in an attempt to meet the timeframe constraints (e.g., and configure a zero content level of the buffer for a communication session). According to one embodiment, a request for exclusive access can include a suggested or required amount of time for the private access.

Figure 9:
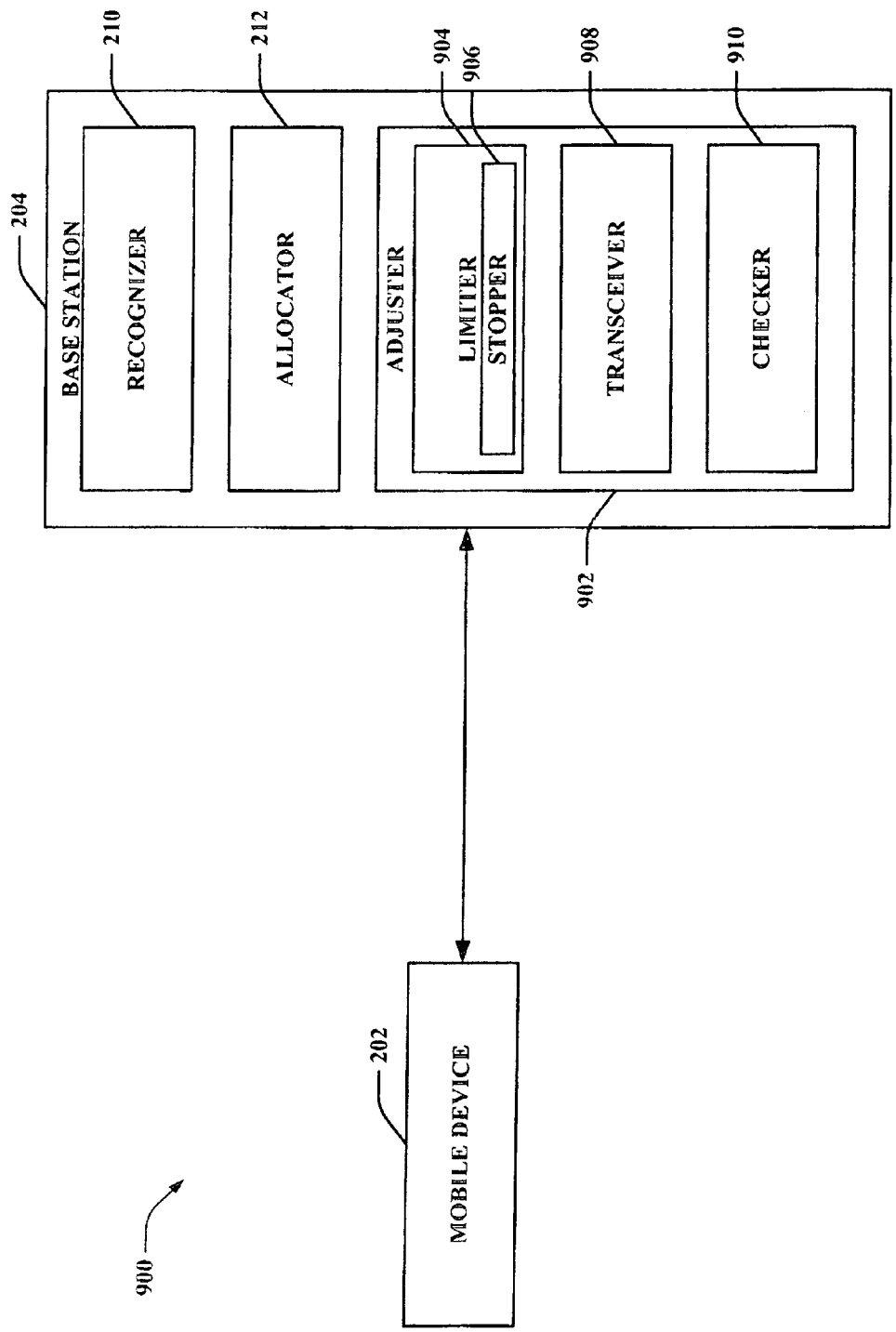
FIG. 9 is an illustration of a representative system with a detailed base station that regulates a shared resource with respect to time in accordance with at least one aspect disclosed herein.

Now referring to FIG. 9, an example system 900 is disclosed for managing operation of a base station 204 (e.g., with a recognizer 210 or allocator 212), such as with communicating with a mobile device 202. The base station 204 can employ an adjuster 902 for governing a shared resource. A limiter 904 can be employed that removes an exclusive use grant to a shared resource for the mobile device 202.

In one implementation, the limiter 904 can include a stopper 906 that removes the exclusive use grant upon expiration of a set time length (e.g., through monitoring of a timer). Thus, when providing a shared resource to the mobile device 202, a time limit can be imposed. The removal can be hard (e.g., when time expires, the grant is removed) as well as soft (e.g., when time expires, the resource is not freed until appropriate packets and acknowledgements are transferred).

A transceiver 908 can be used that collects a notification that there are no more packets for the mobile device to emit upon the shared resource (e.g., sent by the mobile device when a buffer content level is at zero, when time is near finished, etc.). A checker 910 can be used that determines if there is at least one packet not successfully processed and a request can be issued (e.g., through a transmission portion of the transceiver 908) for the packet to be re-sent. According to one embodiment, removal of the exclusive use grant occurs upon determining that there is not a packet that is unsuccessfully processed. The removal of the exclusive use grant can be explicit, such that an instruction is transferred to the mobile device that the resource should be released (e.g., regardless of mobile device operation).

Figure 10:
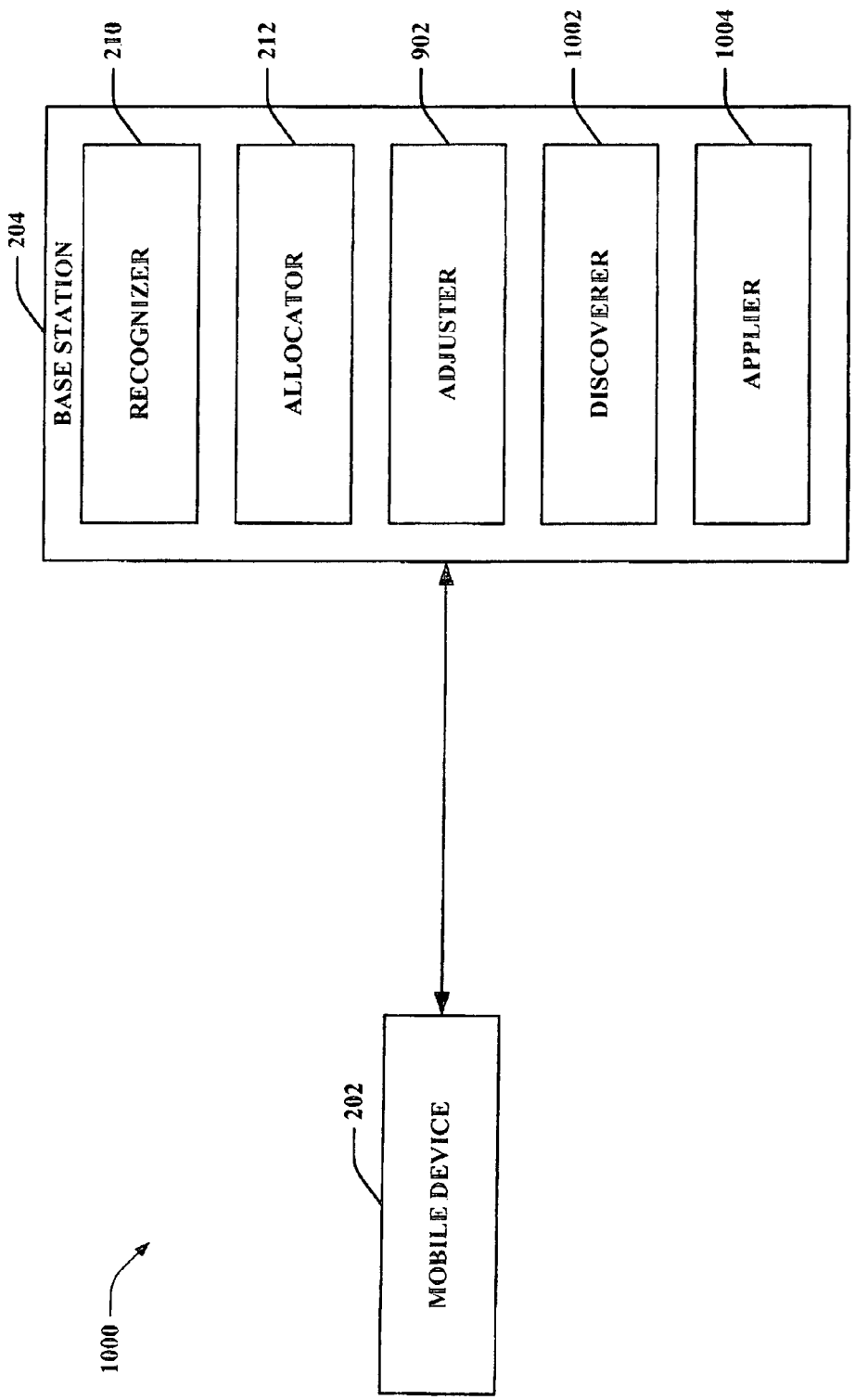
FIG. 10 is an illustration of a representative system with a detailed base station for packet management in accordance with at least one aspect disclosed herein.

Now referring to FIG. 10, an example system 1000 is disclosed for processing communication between a mobile device 202 and base station 204 (e.g., with a recognizer 210 and/or allocator 212). An adjuster 902 can be used to regulate use of a shared resource by a mobile device. The adjuster 902 can use a scheduler to determine when mobile devices can use the shared resource—the scheduler can be open to mobile devices so the devices can make preparations regarding the resource.

A message (e.g., CCCH message) can be made of multiple packets that inter-relate to one another. If a packet is missing (e.g., lost during transmission), then the base station 204 can have a difficult time evaluating the message. The base station can evaluate collected packets and employ a discoverer 1002 that identifies a rogue packet (e.g., a packet not accounted for) upon determining that there is at least one packet not successfully processed (e.g., the determination is made by the adjuster 902). The rogue packet can be identified and an applier 1004 can request retransmission of the rouge packet. Removal of the exclusive use grant based upon the collected notification can be halted if there is a rogue packet outstanding.

Figure 11:
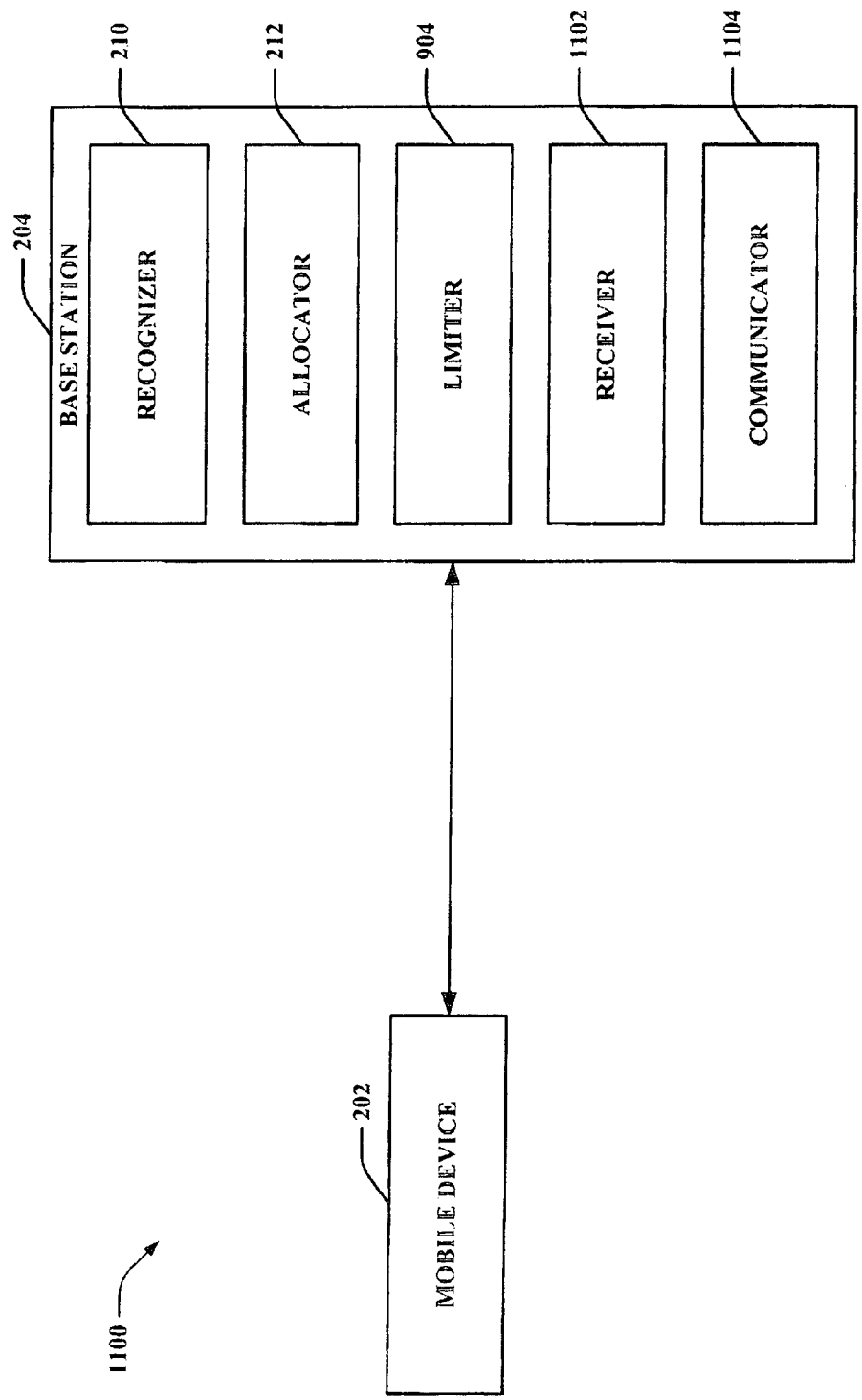
FIG. 11 is an illustration of a representative system for acknowledgement and packet processing with a detailed base station in accordance with at least one aspect disclosed herein.

Now referring to FIG. 11, an example system 1100 is disclosed for communication of a mobile device 202 and base station 204 (e.g., with a recognizer 210 and allocator 212)—the base station 204 can use a limiter 904. A receiver 1102 can be employed by the base station 204 to collect a packet upon the shared resource during the set time length. The packet can be evaluated and a communicator 1104 can transfer an acknowledgement of the packet collection to the mobile device.

It is to be appreciated that artificial intelligence techniques can be used to practice determinations and inferences disclosed herein. These techniques employ one of numerous methodologies for learning from data and then drawing inferences and/or making determinations related to dynamically storing information across multiple storage units (e.g., Hidden Markov Models (HMMs) and related prototypical dependency models, more general probabilistic graphical models, such as Bayesian networks, e.g., created by structure search using a Bayesian model score or approximation, linear classifiers, such as support vector machines (SVMs), non-linear classifiers, such as methods referred to as "neural network" methodologies, fuzzy logic methodologies, and other approaches that perform data fusion, etc.) in accordance with implementing various automated aspects described herein. These techniques can also include methods for capture of logical relationships such as theorem provers or more heuristic rule-based expert systems. These techniques can be represented as an externally pluggable module, in some cases designed by a disparate (third) party.

The following paragraph highlights technical features for example purposes of aspects disclosed herein and are not intended to limit the scope of the claim or disclosure. The UE (User Equipment, such a mobile device 202) can implicitly release a common E-DCH resource when transmitting DTCH (Dedicated Traffic Channel)/DCCH under at least the following condition. First, that there is no downlink activity (HS-DSCH (High Speed Downlink Shared Channel) transmission) occurring while the UE is transmitting on the common E-DCH resource in CELL_FACH (e.g., a UTRA (USTS (Universal Mobile Telecommunications System) Terrestrial Radio Access) RCC (Radio Common Carriers) connected mode state). Upon transmitting a last MAC-i PDU (Message Authorization Code—Integrity Protocol Data Unit) the UE waits for an amount of time before sending the SI (status inquiry)=0 (e.g., empty buffer status report) in a MAC-i PDU. After sending the SI=0, even if the UE receives an ACK (acknowledgement) to the MAC-i PDU that contains the SI=0, the UE can wait for a period corresponding to all the maximum re-transmissions of all pending MAC-i PDUs sent prior to sending the SI=0, or until all pending MAC-i PDUs have been successfully acknowledged whichever occurs first, prior to releasing the E-DCH resource. If a NodeB (e.g., base station 204) upon receiving the SI=0, has yet to receive all the MAC-i PDUs sent prior to the MAC-i PDU that contained the SI=0, then it waits for a maximum number of re-transmissions of all pending MAC-i PDUs sent prior to sending the SI=0, or until all pending MAC-i PDUs have been successfully acknowledged whichever occurs first, prior to releasing the E-DCH resource. In order to keep flexible UL (uplink) scheduling it can be possible to reserve a high value or a "INACTIVE" E-AGCH (enhanced access grant channel) code point with the absolute grant scope of the E-AGCH to set to "all HARQ (Hybrid Automatic Repeat-request) processes" to indicate an E-DCH resource release.

Figure 12:
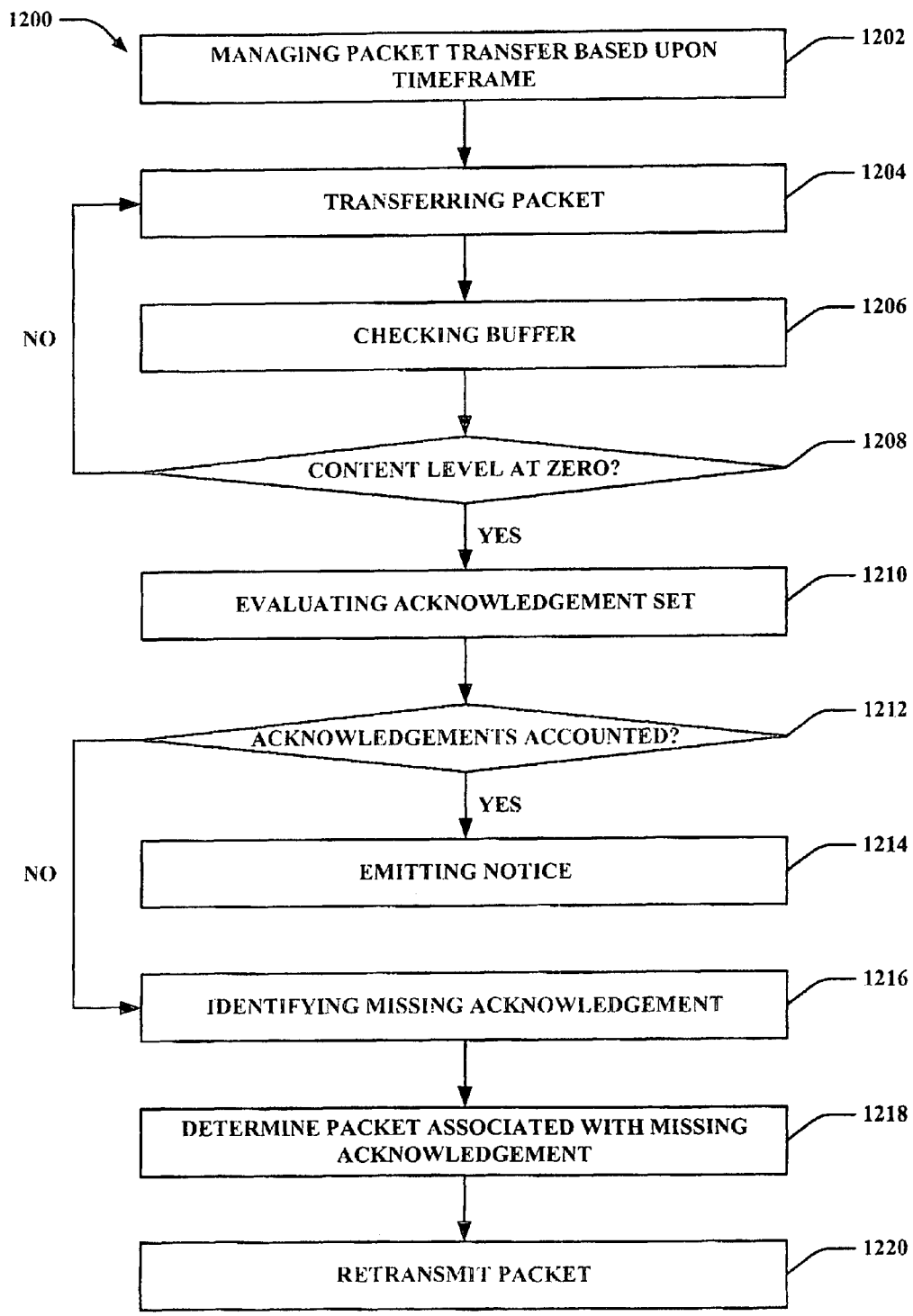
FIG. 12 is an illustration of a representative methodology for packet management in accordance with at least one aspect disclosed herein.

Referring now to FIG. 12, an example methodology 1200 is disclosed for operating a mobile device in relation to use of a shared resource exclusively for a limited time (e.g., without regard to message size). A request can be made for exclusive right to use a communal resource and a period can be provided for the use. Based upon the provided timeframe, there can be management as to how packets should be communicated at act 1202.

Based upon the management (e.g., a sequence upon which packet should be transferred), packet transferring can take place at action 1204—packets can transfer from the mobile device to a base station along a shared resource. A buffer of the mobile device can be evaluated at event 1204 (e.g., checked after each packet is sent). Based upon a result of the evaluation, a determination can be made if a content level is at zero (e.g., overall the level is at zero, the level associated with a particular message is at zero, a scheduled packet list is at zero, etc.) at check 1208.

If it is determined that the content level is not at zero, then another packet can be transferred at action 1204. In an alternative embodiment, evaluation of the buffer can be made on why the level is not at zero (e.g., an error). If the content level is at zero (e.g., all packets have been transferred, even if there are packets not cleared from the buffer), then an acknowledgement set can be evaluated at act 1210. A check 1212 can take place to determine if expected acknowledgements are collected.

If there are no more expected packets, then a notice can be transferred at event 1214 that the shared resource should be released. However, if there are acknowledgements missing, then identification the missing acknowledgement can occur at act 1216 and packets that do not have matching acknowledgements can be identified at action 1218. The packet can be retransmitted to the base station at event 1220—an acknowledgement can be sent and processed by the mobile device and the notice of event 1214 can be sent if appropriate.

Figure 13:
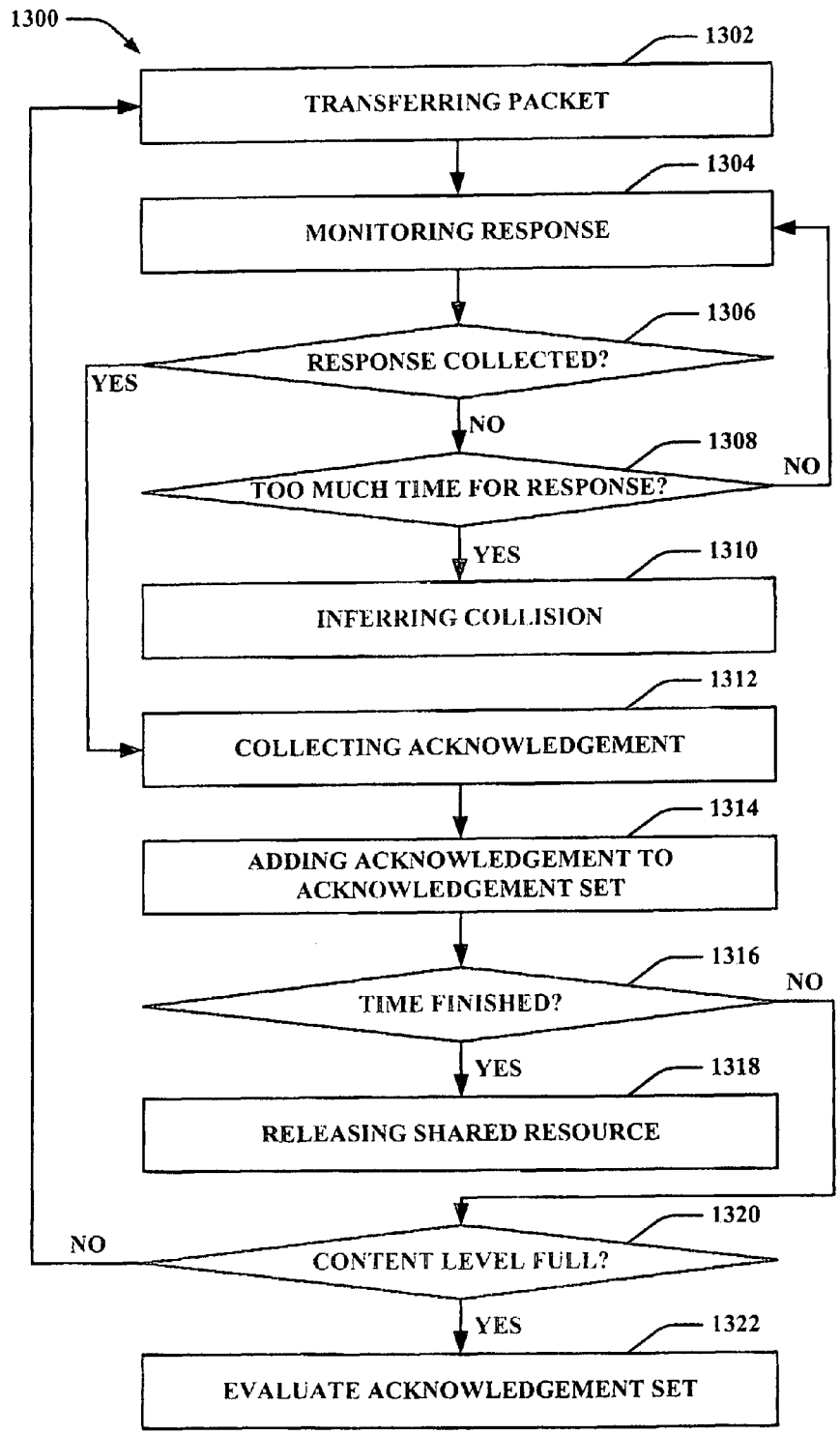
FIG. 13 is an illustration of a representative methodology for performing timing functions regarding a shared resource in accordance with at least one aspect disclosed herein.

Now referring to FIG. 13, an example methodology 1300 is disclosed for timing usage of a shared resource. A request can be made for exclusive access and the request can be granted—based on the response, a packet that is part of a message can be transferred at action 1302. Once the packet is sent, monitoring for a response to the packet (e.g., an acknowledgement) transfer can take place at act 1304.

A check 1306 can operate to determine if a response is collected—if a response is not collected, then another check 1308 can take place to determine if a set time standard is exceeded. If the standard is not exceeded, then the methodology 1300 can return to monitoring at act 1304. However, if the time limit is exceeded, then an inference can be drawn that a resource collision occurs at action 1310. If a resource collision is inferred, then the methodology 1300 can release the shared resource.

If at check 1306 it is determined that a response is collected, then the response (e.g., an acknowledgement, an error message, etc.) can be collected at act 1312 and added to an acknowledgement set at event 1314. A check 1316 can determine if time has elapsed for exclusive use of the resource. If it is determined that tames has elapsed, then the sheared resource can be released at action 1318. Other implementations can be practiced, such as determining if there is appropriate acknowledgement before performing the release.

If the time is not finished, then a check 1320 can determine if there is no more data in the buffer for first transmission (e.g., in a buffer of a mobile device). According to an alternative embodiment, the check 1320 operates prior to check 1316. If the content level is not considered full, then the methodology can return to action 1302 to transfer another packet. However, if the content level is full, then the acknowledgement set can be evaluated at act 1322 and depending on the response, appropriate action can occur (e.g., the resource can be released, a request for missing acknowledgements can be transferred, etc.).

Figure 14:
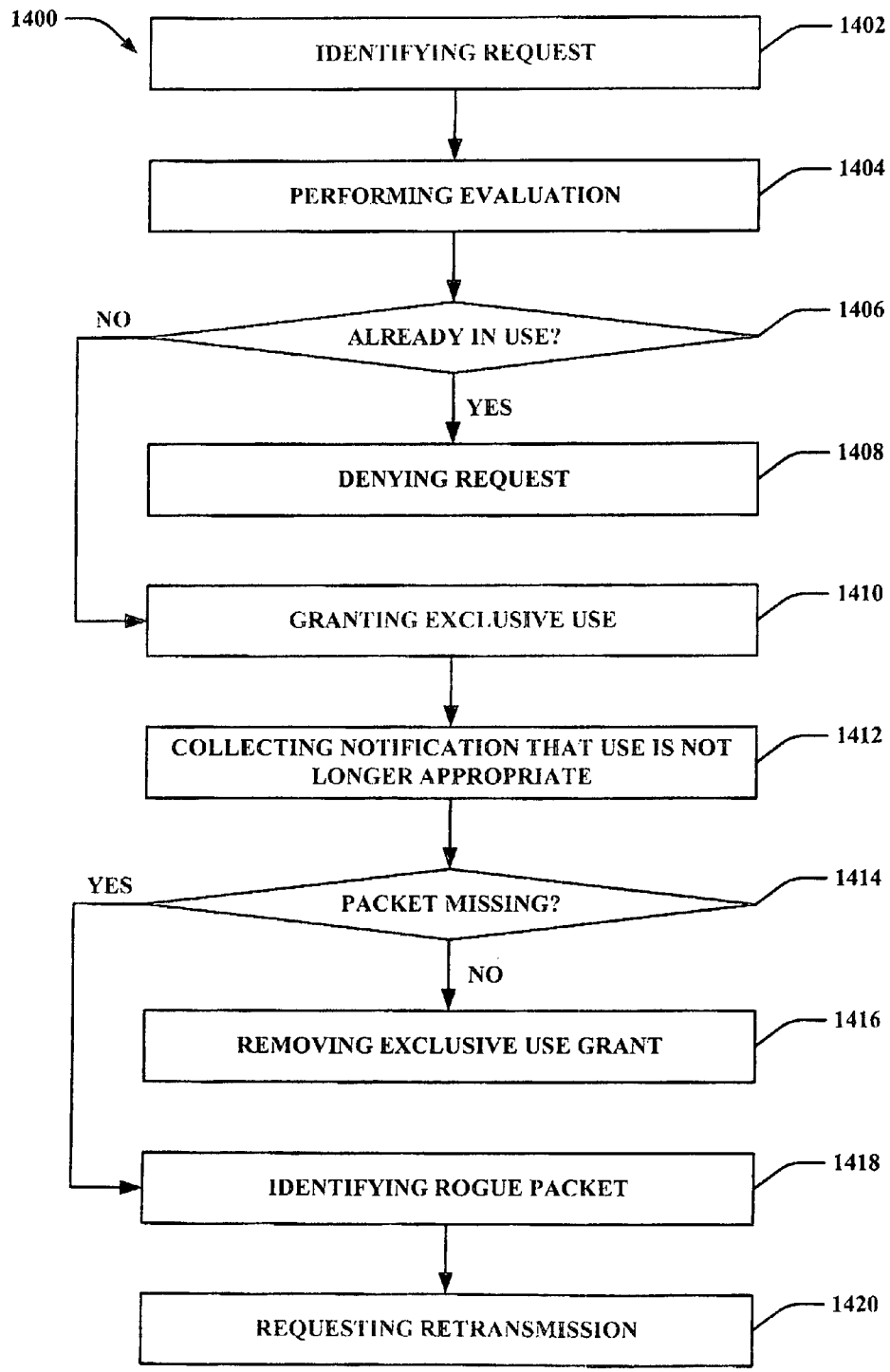
FIG. 14 is an illustration of a representative methodology for management of a shared resource in accordance with at least one aspect disclosed herein.

Referring now to FIG. 14, an example methodology 1400 is disclosed for managing allocation of a shared resource. A request (e.g., at a base station) can be collected at act 1402 for exclusive access to a resource (e.g., for a period, for as long as the base station allows, etc.). The request can be evaluated to determine characteristics of the request at event 1404, including which resource is being requested. In one implementation, multiple shared resources can exist with a base station and different mobile devices can request to use diverse resources.

A check 1406 can be performed to determine if the requested resource is already in use by another mobile device. If already in use, then the request can be denied through action 1408. In an illustrative embodiment, an evaluation of the occupation can be performed—for instance, it can be determined which mobile device is using the resource, if a requesting resource has higher priority than a user device (e.g., and thus the user can be removed), how much longer the user has exclusive access, if the requesting mobile device can be added to a schedule, etc. If the resource is not already in use, then exclusive access can be granted through event 1410. As part of the evaluation of event 1404, a determination can be made if the mobile device should be granted exclusive access (e.g., based on if the mobile device is authorized, the resource is allowed to be provided exclusive access, etc.).

At action 1412, there can be collecting a notification that exclusive use is no longer appropriate (e.g., a timer expires, a content level of a buffer is full, etc.). A check 1414 can be performed to determine if there is a packet missing—for instance, message packets collected can be evaluated to determine if there is a missing packet. If there is not a packet missing, then the exclusive use grant can be removed at event 1416. However, if there is a packet missing, then a rogue packet can be identified at act 1418 and a request can be made to re-transmit the missing packet. If after several request the packet is not collected, then the message can be disregarded and an error report generated.

Figure 15:
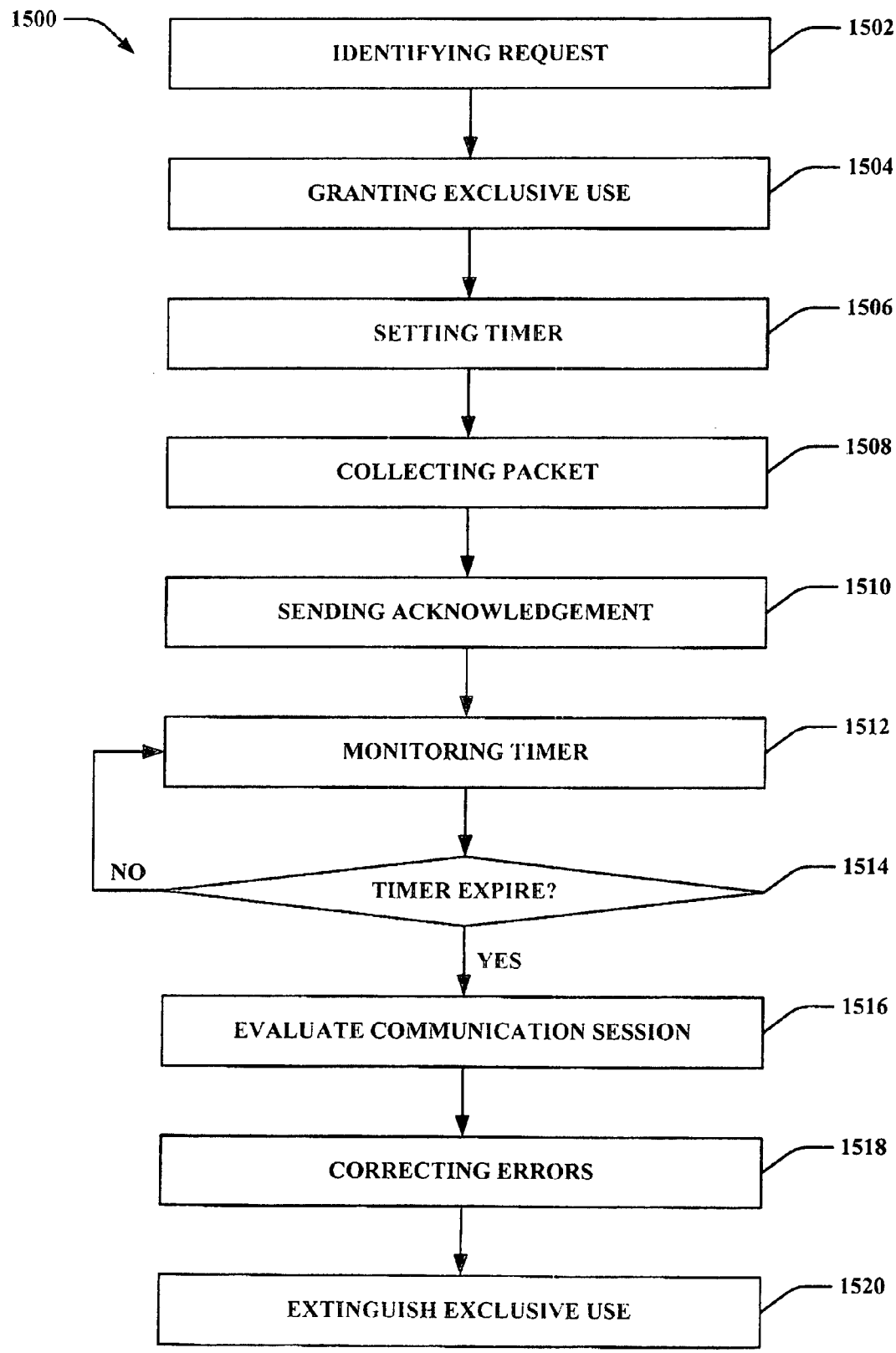
FIG. 15 is an illustration of a representative methodology for determining when to release a shred resource in accordance with at least one aspect disclosed herein.

Now referring to FIG. 15, an example methodology 1500 is disclosed for using a timer regarding exclusive grant management of a shared resource. A request for exclusive use can be identified at 1502 and the exclusive use can be granted at action 1504. When the exclusive grant is provided, a timer can be initiated at action 1506 (e.g., at a base station, at a mobile device, etc.). A packet of a message can be collected at event 1508 and an appropriate acknowledgement can be determined and transferred at action 1510.

The timer can be monitored at act 1512 and a check 1514 can determine if the time expires. If the time does not expire, then there can be continued monitoring (e.g., the methodology 1500 returns to act 1512). However, if the time expires, there can be an evaluation of a communication session at event 1516 (e.g., determining if all appropriate acknowledgements are sent, that appropriate packets are received and processed, etc.). A determined error (e.g., lack of acknowledgement, lack of packet, etc.) can be corrected at event 1518 (e.g., as well as a determination made on an appropriate manner of correction) and the exclusive use can be extinguished at action 1520.

Referring to FIGS. 12-15, methodologies relating to timers in relation to allocation of a shared resource are disclosed. While, for purposes of simplicity of explanation, the methodologies are shown and described as a series of acts, it is to be understood and appreciated that the methodologies are not limited by the order of acts, as some acts can, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with one or more embodiments.

It will be appreciated that, in accordance with one or more aspects described herein, inferences can be made regarding whether exclusive use should be granted, exclusive use should end, etc. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more methods presented above can include making inferences pertaining to packet acknowledgement. By way of further illustration, an inference can be made related to communicating packets, timer expiration, etc. It will be appreciated that the foregoing examples are illustrative in nature and are not intended to limit the number of inferences that can be made or the manner in which such inferences are made in conjunction with the various embodiments and/or methods described herein.

Figure 16:
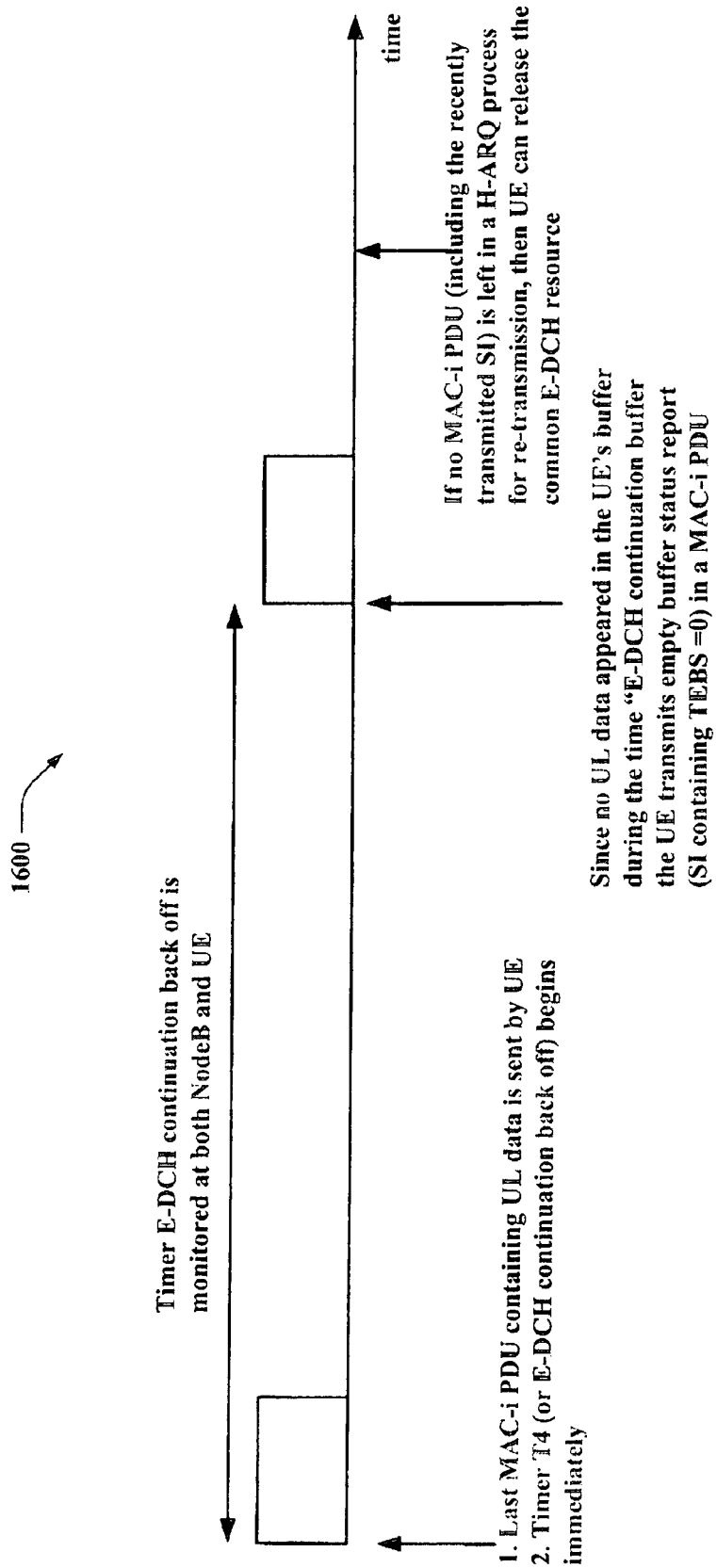
FIG. 16 is an illustration of a representative timing diagram in accordance with at least one aspect disclosed herein.

FIG. 16 shows an example timing diagram 1600 that can be used in accordance with implantation of aspects disclosed herein. At least in part, the timing diagram 1600 can relate to aspects concerning uplink (UL), Hybrid Automatic Repeat Request (H-ARQ or HARQ), or Total E-DCH Buffer Status (TEBS). Aspects disclosed relating to FIG. 16 can be practiced at least by the analyzer 208 of FIG. 2 or the recognizer 210 of FIG. 2.

For FDD and for CCCH transmission in CELL_FACH state and Idle mode, the transmission of Scheduling Information (SI) can implement such that there is only triggering when TEBS becomes zero and the MAC-i PDU containing last data is being transmitted. The SI can be transmitted with the MAC-i PDU carrying last data when a serving grant is sufficient to carry the SI with last remaining data. Otherwise, an empty buffer status report can transmitted separately with a next MAC-i PDU.

For FDD and for DTCH/DCCH transmission in CELL_FACH state, the transmission of Scheduling Information could be triggered once, if TEBS remains zero and no higher layer data remains in MAC to be transmitted for a period given by E-DCH transmission continuation back off period unequal "infinity". For FDD and for DTCH/DCCH transmission in CELL_FACH state with E-DCH transmission continuation back off period set to "infinity" or "zero", the transmission of Scheduling Information can be triggered each time when the TEBS becomes zero and no higher layer data remains in MAC to be transmitted after the transmission of the MAC-i PDU containing the scheduling information with empty buffer status report.

If the Scheduling Information should be included in the MAC-e or MAC-i PDU, then the Scheduling Information could be transmitted regardless of TEBS status. If UE is sending CCCH data in CELL_FACH state or Idle mode, then the UE can release the common E-DCH resource, for example, under following conditions: 1. no MAC-i PDU is pending for transmission, 2. maximum E-DCH resource allocation for CCCH is reached, or 3. a synchronization failure is reported.

If the UE is sending DTCH or DCCH data, then the UE can release the common E-DCH resource, for example, under following conditions: 1. a synchronization failure occurs, 2. the maximum period for collision resolution is reached and no E-AGCH with the UE's (E-DCH Radio Network Temporary Identifier) E-RNTI (e.g., through an E-RNTI specific CRC attachment) has been reached, 3. An E-DCH Absolute Grant Channel (E-AGCH) can be received with a common E-DCH resource release command (e.g., INACTIVE—explicit common E-DCH resource release), or 4. "E-DCH transmission continuation back off" is not set to "infinity", the empty buffer status (TEBS=0 byte) has been reported and no MAC-i PDU is left in a HARQ process for transmission (transmission or retransmission). A maximum E-DCH resource allocation for CCCH can be a timer T2 and E-DCH transmission continuation back off variable can be timer T4. The SI can be transmitted with the MAC-i PDU carrying last data when a serving grant is sufficient to carry the SI with last remaining data. Otherwise, an empty buffer status report can transmitted separately with a next MAC-i PDU There can also be implicit release with E-DCH transmission continuation backoff. Implicit resource release could enabled in a limited manner, such as only if "E-DCH transmission continuation back off" is not set to "infinity". If implicit resource release is enabled, then in case of DTCH/DCCH transmission, a timer Tb can be set to "E-DCH transmission continuation back off" value, when TEBS is 0 byte and a last generated MAC-i PDU with higher layer data is provided with a PHY-data-REQ primitive to a physical layer for transmission.

If TEBS < >0 byte is detected while timer Tb is running, then the timer could be stopped and uplink data transmission on the common E-DCH resource continues. If a MAC-ehs (evolved media access control) PDU is received while timer Tb is running, then the timer could be re-started.

At expiry of timer Tb the MAC-STATUS-Ind primitive can indicate to Radio Link Channel (RLC) for each logical channel that no PDUs shall be transferred to MAC. TEBS=0 byte can be reported to the Node B MAC as SI in a MAC-i PDU. If the "E-DCH transmission continuation back off" value is set to "0", then the SI should be transmitted with the MAC-i PDU carrying a last DCCH/DTCH data, (e.g., given a serving grant is sufficient to carry the SI in a same MAC-i PDU together with remaining DCCH/DTCH data). Otherwise, the empty buffer status report could be transmitted separately with the next MAC-i PDU.

If after the expiry of timer Tb no MAC-i PDU is left in a HARQ process for (re-)transmission, then this triggers a CMAC-STATUS which informs the RRC about end of the Enhanced Uplink for CELL_FACH state and Idle mode.

Figure 17:
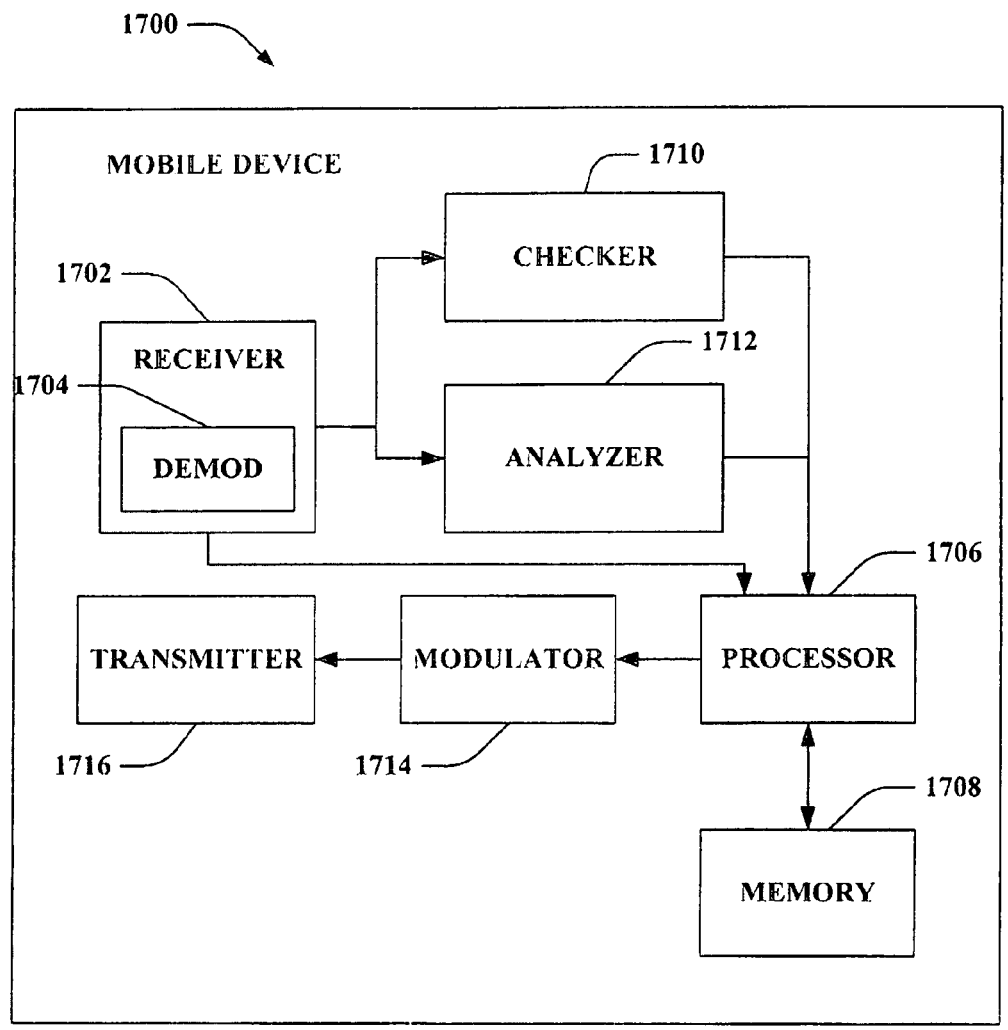
FIG. 17 is an illustration of an example mobile device that facilitates allocation of a shared resource in accordance with at least one aspect disclosed herein.

FIG. 17 is an illustration of a mobile device 1700 that facilitates exclusive use of a shared resource. Mobile device 1700 comprises a receiver 1702 that receives a signal from, for instance, a receive antenna (not shown), and performs typical actions thereon (e.g., filters, amplifies, downconverts, etc.) the received signal and digitizes the conditioned signal to obtain samples. Receiver 1702 can be, for example, an MMSE receiver, and can comprise a demodulator 1704 that can demodulate received symbols and provide them to a processor 1706 for channel estimation. Processor 1706 can be a processor dedicated to analyzing information received by receiver 1702 and/or generating information for transmission by a transmitter 1716, a processor that controls one or more components of mobile device 1700, and/or a processor that both analyzes information received by receiver 1702, generates information for transmission by transmitter 1716, and controls one or more components of mobile device 1700.

Mobile device 1700 can additionally comprise memory 1708 that is operatively coupled to processor 1706 and that can store data to be transmitted, received data, information related to available channels, data associated with analyzed signal and/or interference strength, information related to an assigned channel, power, rate, or the like, and any other suitable information for estimating a channel and communicating via the channel. Memory 1708 can additionally store protocols and/or algorithms associated with estimating and/or utilizing a channel (e.g., performance based, capacity based, etc.).

It will be appreciated that the data store (e.g., memory 1708) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1708 of the subject systems and methods is intended to comprise, without being limited to, these and any other suitable types of memory.

Processor 1702 is further operatively coupled to a checker 1710 and/or an analyzer 1712. The checker 1710 can determines that a content level of a buffer of the mobile device reaches a predetermined level. Moreover, the analyzer 1712 can evaluates an acknowledgement set to establish if appropriate acknowledgements are collected, the evaluation occurs upon the content level reaching the predetermined level. Mobile device 1700 still further comprises a modulator 1714 and a transmitter 1716 that transmits a signal (e.g., base CQI and differential CQI) to, for instance, a base station, another mobile device, etc. Although depicted as being separate from the processor 1706, it is to be appreciated that checker 1710 and/or analyzer 1712 can be part of processor 1706 or a number of processors (not shown).

Figure 18:
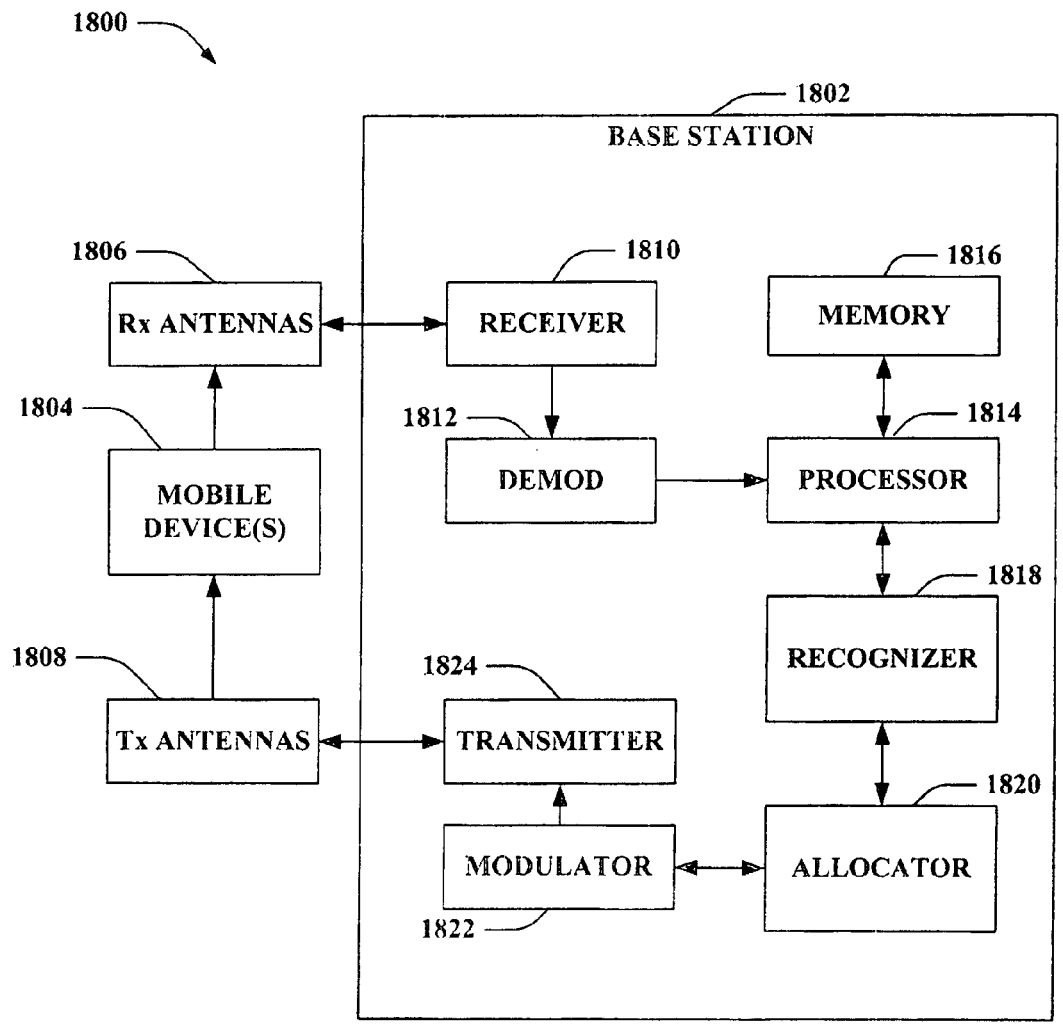
FIG. 18 is an illustration of an example system that facilitates a management of a shared resource in accordance with at least one aspect disclosed herein.

FIG. 18 is an illustration of a system 1800 that facilitates employing a semi-connected mode. System 1800 comprises a base station 1802 (e.g. access point, . . . ) with a receiver 1810 that receives signal(s) from one or more mobile devices 1804 through a plurality of receive antennas 1806, and a transmitter 1822 that transmits to the one or more mobile devices 1804 through a plurality of transmit antennas 1808. Receiver 1810 can receive information from receive antennas 1806 and is operatively associated with a demodulator 1812 that demodulates received information. Demodulated symbols are analyzed by a processor 1814 that can be similar to the processor described above with regard to FIG. 17, and which is coupled to a memory 1816 that stores information related to estimating a signal (e.g. pilot) strength and/or interference strength, data to be transmitted to or received from mobile device(s) 1804 (or a disparate base station (not shown)), and/or any other suitable information related to performing the various actions and functions set forth herein.

Processor 1814 is further coupled to a recognizer 1818 and/or to an allocator 1820. The recognizer 1818 can identify a request—the request can be from a mobile device for exclusive use of a shared resource. Moreover, the allocator 1820 can grant the mobile device exclusive use to the shared resource for a set time length. Information to be transmitted can be provided to a modulator 1822. Modulator 1822 can multiplex the information for transmission by a transmitter 1824 through antenna 1808 to mobile device(s) 1804. Although depicted as being separate from the processor 1814, it is to be appreciated that recognizer 1818 and/or allocator 1820 can be part of processor 1814 or a number of processors (not shown).

Figure 19:
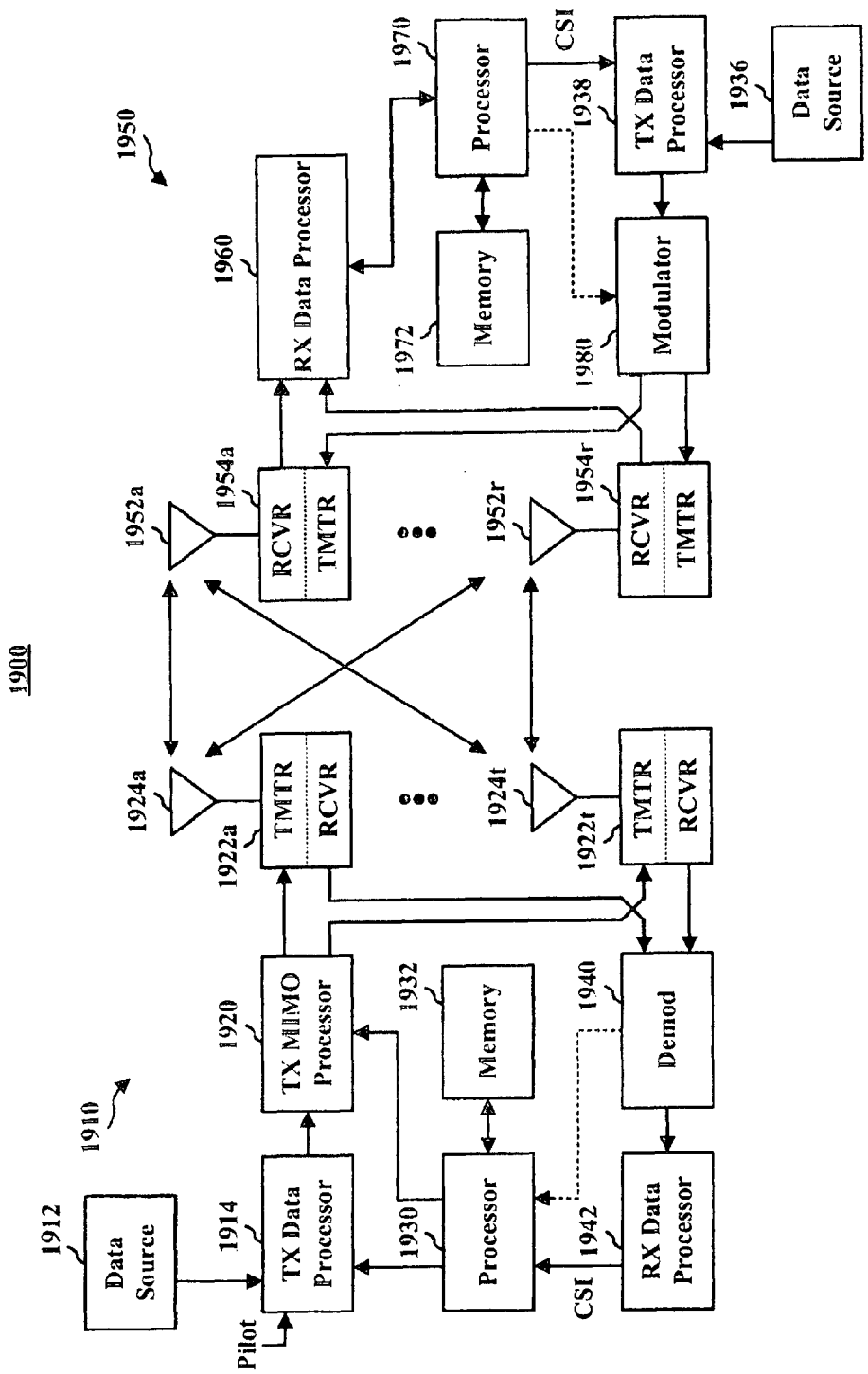
FIG. 19 is an illustration of an example wireless network environment that can be employed in conjunction with the various systems and methods described herein.

FIG. 19 shows an example wireless communication system 1900. The wireless communication system 1900 depicts one base station 1910 and one mobile device 1950 for sake of brevity. However, it is to be appreciated that system 1900 can include more than one base station and/or more than one mobile device, wherein additional base stations and/or mobile devices can be substantially similar or different from example base station 1910 and mobile device 1950 described below. In addition, it is to be appreciated that base station 1910 and/or mobile device 1950 can employ the systems (FIGS. 1-11 and 17-18) and/or methods (FIGS. 12-15) described herein to facilitate wireless communication there between.

At base station 1910, traffic data for a number of data streams is provided from a data source 1912 to a transmit (TX) data processor 1914. According to an example, each data stream can be transmitted over a respective antenna. TX data processor 1914 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1950 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1930.

The modulation symbols for the data streams can be provided to a TX MIMO processor 1920, which can further process the modulation symbols (e.g., for OFDM). TX MIMO processor 1920 then provides $N_T$ modulation symbol streams to $N_T$ transmitters (TMTR) 1922a through 1922t. In various embodiments, TX MIMO processor 1920 applies beamforming weights to the symbols of the data streams and to the antenna from which the symbol is being transmitted.

Each transmitter 1922 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1922a through 1922t are transmitted from $N_T$ antennas 1924a through 1924t, respectively.

At mobile device 1950, the transmitted modulated signals are received by $N_R$ antennas 1952a through 1952r and the received signal from each antenna 1952 is provided to a respective receiver (RCVR) 1954a through 1954r. Each receiver 1954 conditions (e.g., filters, amplifies, and downconverts) a respective signal, digitizes the conditioned signal to provide samples, and further processes the samples to provide a corresponding "received" symbol stream.

An RX data processor 1960 can receive and process the $N_R$ received symbol streams from $N_R$ receivers 1954 based on a particular receiver processing technique to provide $N_T$ "detected" symbol streams. RX data processor 1960 can demodulate, deinterleave, and decode each detected symbol stream to recover the traffic data for the data stream. The processing by RX data processor 1960 is complementary to that performed by TX MIMO processor 1920 and TX data processor 1914 at base station 1910.

A processor 1970 can periodically determine which preceding matrix to utilize as discussed above. Further, processor 1970 can formulate a reverse link message comprising a matrix index portion and a rank value portion.

The reverse link message can comprise various types of information regarding the communication link and/or the received data stream. The reverse link message can be processed by a TX data processor 1938, which also receives traffic data for a number of data streams from a data source 1936, modulated by a modulator 1980, conditioned by transmitters 1954a through 1954r, and transmitted back to base station 1910.

At base station 1910, the modulated signals from mobile device 1950 are received by antennas 1924, conditioned by receivers 1922, demodulated by a demodulator 1940, and processed by a RX data processor 1942 to extract the reverse link message transmitted by mobile device 1950. Further, processor 1930 can process the extracted message to determine which preceding matrix to use for determining the beamforming weights.

Processors 1930 and 1970 can direct (e.g., control, coordinate, manage, etc.) operation at base station 1910 and mobile device 1950, respectively. Respective processors 1930 and 1970 can be associated with memory 1932 and 1972 that store program codes and data. Processors 1930 and 1970 can also perform computations to derive frequency and impulse response estimates for the uplink and downlink, respectively.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 20:
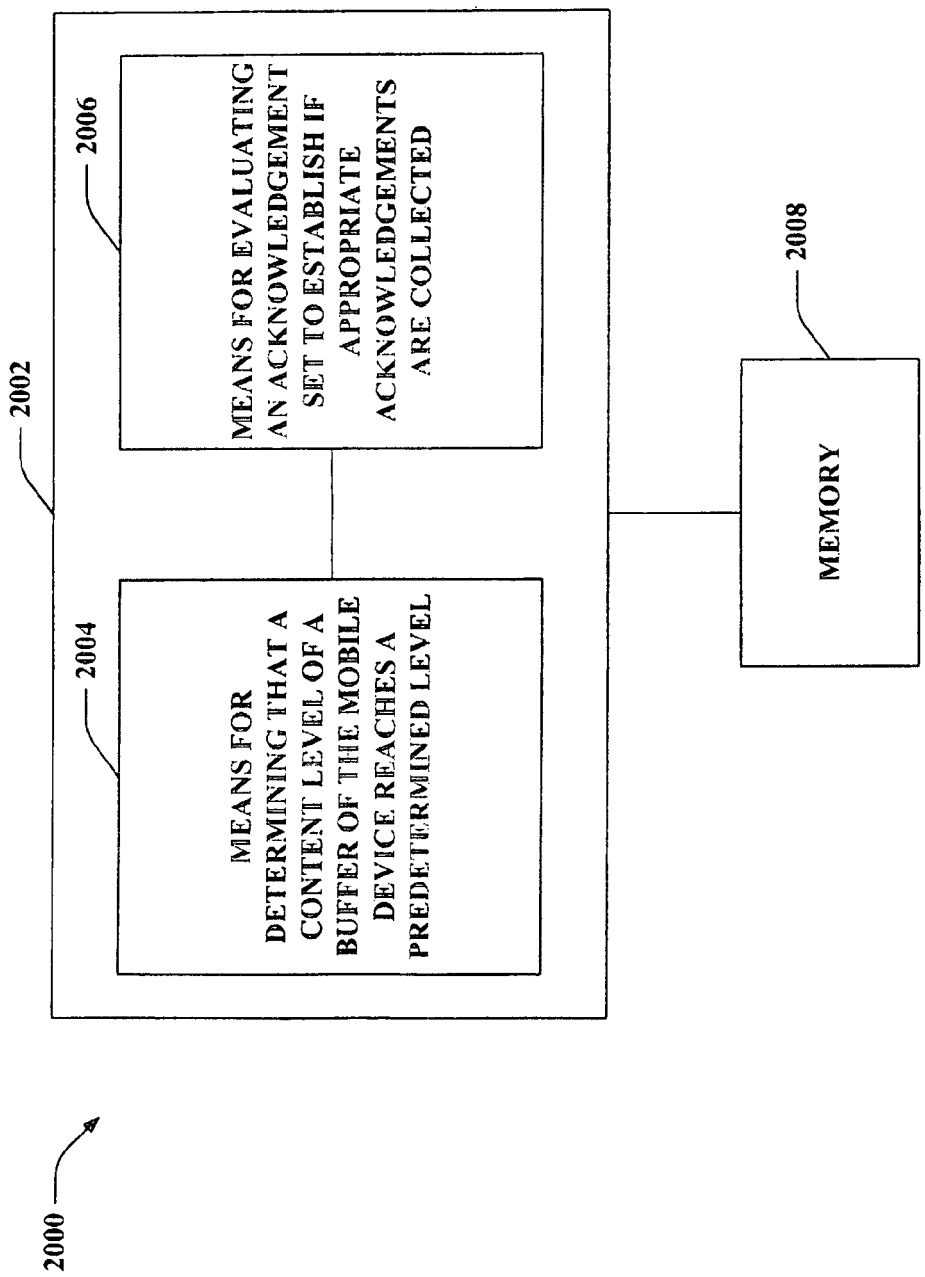
FIG. 20 is an illustration of an example system that facilitates use of a shared resource for a mobile device in accordance with at least one aspect disclosed herein.

With reference to FIG. 20, illustrated is a system 2000 that regulates exclusive use of a resource. For example, system 2000 can reside at least partially within a mobile device. It is to be appreciated that system 2000 is represented as including functional blocks, which can be functional blocks that represent functions implemented by a processor, software, or combination thereof (e.g., firmware). System 2000 includes a logical grouping 2002 of electrical components that can act in conjunction. For instance, logical grouping 2002 can include means for determining that a content level of a buffer of the mobile device reaches a predetermined level 2004 as well as means for evaluating an acknowledgement set to establish if appropriate acknowledgements are collected 2006. The evaluation can occur upon the content level reaching the predetermined level. While shown as being external to memory 2008, it is to be understood that one or more of means 2004 and 2006 (e.g., electrical components) can exist within memory 2008.

Figure 21:
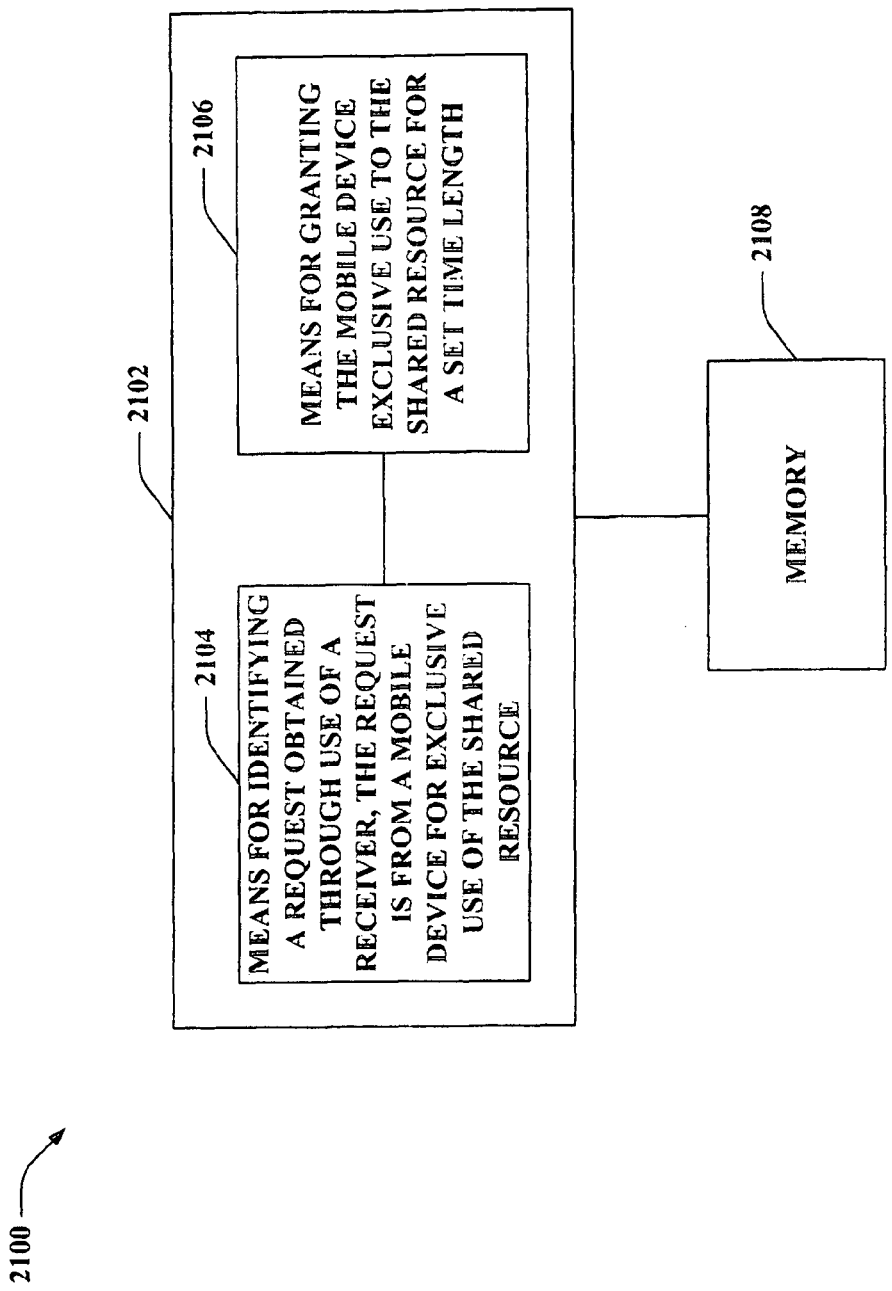
FIG. 21 is an illustration of an example system that facilitates shared resource management in accordance with at least one aspect disclosed herein.

Turning to FIG. 21, illustrated is a system 2100 that manages exclusive use of a shared resource. System 2100 can reside within a base station, for instance. As depicted, system 2100 includes functional blocks that can represent functions implemented by a processor, software, or combination thereof (e.g. firmware). System 2100 includes a logical grouping 2102 of electrical components that operate in conjunction. Logical grouping 2102 can include means for identifying a request obtained through use of a receiver, the request is from a mobile device for exclusive use of the shared resource 2104 as well as means for granting the mobile device exclusive use to the shared resource for a set time length 2106. While shown as being external to memory 2108, it is to be understood that means 2104 and 2106 (e.g., electrical components) can exist within memory 2108.

The various illustrative logics, logical blocks, modules, and circuits described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration. Additionally, at least one processor can comprise one or more modules operable to perform one or more of the steps and/or actions described above.

Further, the steps and/or actions of a method or algorithm described in connection with the aspects disclosed herein can be embodied directly in hardware, in a software module executed by a processor, or in a combination of the two. A software module can reside in RAM memory, flash memory, ROM memory, EPROM memory, EEPROM memory, registers, a hard disk, a removable disk, a CD-ROM, or any other form of storage medium known in the art. An exemplary storage medium can be coupled to the processor, such that the processor can read information from, and write information to, the storage medium. In the alternative, the storage medium can be integral to the processor. Further, in some aspects, the processor and the storage medium can reside in an ASIC. Additionally, the ASIC can reside in a user terminal. In the alternative, the processor and the storage medium can reside as discrete components in a user terminal. Additionally, in some aspects, the steps and/or actions of a method or algorithm can reside as one or any combination or set of codes and/or instructions on a machine readable medium and/or computer readable medium, which can be incorporated into a computer program product.

In one or more aspects, the functions described can be implemented in hardware, software, firmware, or any combination thereof. If implemented in software, the functions can be stored or transmitted as one or more instructions or code on a computer-readable medium. Computer-readable media includes both computer storage media and communication media including any medium that facilitates transfer of a computer program from one place to another. A storage medium can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection can be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

What has been described above includes examples of one or more embodiments. It is, of course, not possible to describe every conceivable combination of components or methodologies for purposes of describing the aforementioned embodiments, but one of ordinary skill in the art can recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments can be described or claimed in the singular, the plural is contemplated unless limitation to the singular is explicitly stated. Additionally, all or a portion of any aspect and/or embodiment can be utilized with all or a portion of any other aspect and/or embodiment, unless stated otherwise.

What is claimed is:

1. A method for administering operation of a mobile device operable upon a wireless communication system comprising:
   determining that a content level of a buffer of the mobile device reaches a predetermined level;
   sending scheduling information in response to the content level reaching the predetermined level;
   evaluating an acknowledgement set to establish if appropriate acknowledgements are collected from a base station, the evaluation occurs upon the content level reaching the predetermined level; and
   releasing a shared resource to which the mobile device has exclusive access for a limited time, wherein the shared resource is released early before expiration of the limited time in response to the evaluation indicating that appropriate acknowledgements are collected from the base station.

2. The method of claim 1, further comprising collecting at least one acknowledgement, the acknowledgement set includes the collected acknowledgement.

3. The method of claim 1, further comprising emitting at least one packet upon the shared resource, the at least one packet includes a request for an acknowledgement for addition in the acknowledgement set in response to successful packet obtainment.

4. The method of claim 1, further comprising transferring a packet from the mobile device to the base station along the shared resource, upon obtaining the packet the base station transfers an acknowledgement that the packet is successfully obtained and the transferred acknowledgement is added to the acknowledgement set upon collection.

5. The method of claim 1, further comprising:
   establishing that appropriate acknowledgement is accounted for; and
   emitting a notice upon establishing that the appropriate acknowledgement is accounted for, the notice is indicative that the shared resource should be released.

6. The method of claim 1, further comprising:
   establishing that appropriate acknowledgement is not accounted for;
   identifying at least one missing acknowledgement; and
   re-transmitting a packet that associates with the missing acknowledgement.

7. The method of claim 1, further comprising:
   requesting exclusive access to the shared resource for the mobile device;
   collecting an instruction that the exclusive access is granted for a timeframe; and
   emitting at least one packet upon the shared resource, the at least one packet includes a request for an acknowledgement for addition in the acknowledgement set in response to successful packet obtainment.

8. The method of claim 7, further comprising:
   instigating a timer upon emitting the at least one packet;
   monitoring for an acknowledgement to the packet; and
   inferring that there is resource collision when the timer reaches a set level and an acknowledgement is not collected; and
   releasing the shared resource upon making the inference.

9. The method of claim 1, further comprising:
   starting a timer when the buffer reaches the predetermined level; and
   monitoring the timer.

10. The method of claim 9, further comprising:
    determining that the timer expires; and
    determining if the acknowledgement set is empty, upon determining that the acknowledgement set is empty the resource is released.

11. The method of claim 9, further comprising:
    identifying that the buffer receives a packet; and
    determining if the timer is expired, if the timer is not expired, then the timer is reset.

12. The method of claim 1, further comprising:
    concluding if a last packet is sufficient to carry the scheduling information;
    transferring the scheduling information on the last packet upon a positive conclusion; and
    transferring the scheduling information on a later packet upon a negative conclusion.

13. The method of claim 1, wherein the predetermined level corresponds to an empty state of the buffer, and wherein evaluating the acknowledgement set comprises determining whether the mobile device has collected acknowledgements from the base station for packets previously transmitted from the buffer by the mobile device to the base station.

14. The method of claim 13, wherein releasing the shared resource occurs upon determining that the previously transmitted packets have been acknowledged.

15. An apparatus, comprising:
    a checker that determines that a content level of a buffer of the mobile device reaches a predetermined level;
    a transmitter that sends scheduling information in response to the content level reaching the predetermined level;
    an analyzer that evaluates an acknowledgement set to establish if appropriate acknowledgements are collected from a base station, the evaluation occurs upon the content level reaching the predetermined level; and a discharger that releases a shared resource to which the mobile device has exclusive access for a limited time, wherein the shared resource is released early before expiration of the limited time in response to the evaluation indicating that appropriate acknowledgements are collected from the base station.

16. The apparatus of claim 15, further comprising an obtainer that collects at least one acknowledgement, the acknowledgement set includes the collected acknowledgement.

17. The apparatus of claim 15, further comprising a transmitter that emits at least one packet upon the shared resource, the at least one packet includes a request for an acknowledgement for addition in the acknowledgement set in response to successful packet obtainment.

18. The apparatus of claim 15, further comprising a transmitter that transfers a packet from the mobile device to the base station, upon obtaining the packet the base station transfers an acknowledgement that the packet is successfully obtained and the transferred acknowledgement is added to the acknowledgement set upon collection.

19. The apparatus of claim 18, the packet is transferred along the shared resource.

20. The apparatus of claim 15, further comprising:
a comparator that establishes that appropriate acknowledgement is accounted for; and
a transmitter that emits a notice upon establishing that the appropriate acknowledgement is accounted for, the notice is indicative that the shared resource should be released.

21. The apparatus of claim 15, further comprising:
a comparator that establishes that appropriate acknowledgement is not accounted for;
a classifier that identifies at least one missing acknowledgement; and
a transmitter that re-transmits a packet that associates with the missing acknowledgement.

22. The apparatus of claim 15, further comprising:
a petitioner that requests exclusive access to the shared resource for the mobile device;
a gatherer that collects an instruction that the exclusive access is granted for a timeframe; and
a transmitter that emits at least one packet upon the shared resource, the at least one packet includes a request for an acknowledgement for addition in the acknowledgement set in response to successfully packet obtainment.

23. The apparatus of claim 22, further comprising:
a setter that instigates a timer upon emitting the at least one packet;
an observer that monitors for an acknowledgement to the packet; and
a concluder that infers that there is resource collision when the timer reaches a set level and an acknowledgement is not collected, wherein the discharger releases the shared resource upon making the inference.

24. The apparatus of claim 22, further comprising:
a setter that instigates a timer upon collecting the instruction; and
an examiner that identifies when the timeframe of the shared resource expires, wherein the discharger releases the shared resource upon making the identification.

25. The apparatus of claim 24, further comprising a director that manages packet emission based upon the timeframe, emission of the at least one packet occurs in accordance with the management.

26. The apparatus of claim 22, the exclusive access does not limit size of transmission content.

27. At least one processor configured to administer operation of a mobile device, comprising:
a first module for determining that a content level of a buffer of the mobile device reaches a predetermined level;
a second module for sending scheduling information in response to the content level reaching the predetermined level;
a third module for evaluating an acknowledgement set to establish if appropriate acknowledgements are collected from a base station, the evaluation occurs upon the content level reaching the predetermined level; and
a fourth module for releasing a shared resource to which the mobile device has exclusive access for a limited time, wherein the shared resource is released early before expiration of the limited time in response to the evaluation indicating that appropriate acknowledgements are collected from the base station.

28. A non-transitory computer-readable medium comprising:
a first set of codes for causing a computer to determine that a content level of a buffer of the mobile device reaches a predetermined level;
a second set of codes for sending scheduling information in response to the content level reaching the predetermined level;
a third set of codes for causing the computer to evaluate an acknowledgement set to establish if appropriate acknowledgements are collected from a base station, the evaluation occurs upon the content level reaching the predetermined level; and
a fourth set of codes for causing the computer to release a shared resource to which the mobile device has exclusive access for a limited time, wherein the shared resource is released early before expiration of the limited time in response to the evaluation indicating that appropriate acknowledgements are collected from the base station.

29. An apparatus, comprising:
means for determining that a content level of a buffer of the mobile device reaches a predetermined level;
means for sending scheduling information in response to the content level reaching the predetermined level;
means for evaluating an acknowledgement set to establish if appropriate acknowledgements are collected from a base station, the evaluation occurs upon the content level reaching the predetermined level; and
means for releasing a shared resource to which the mobile device has exclusive access for a limited time, wherein the shared resource is released early before expiration of the limited time in response to the evaluation indicating that appropriate acknowledgements are collected from the base station.

30. A method for administering operation of a mobile device operable upon a wireless communication system comprising:
determining that a content level of a buffer of the mobile device is empty;
sending scheduling information upon determining that the buffer is empty;
evaluating an acknowledgement set to establish if appropriate acknowledgements are collected, the evaluation occurring upon determining that the buffer is empty; and
releasing a shared upon determining that the acknowledgement set is empty.

* * * * *